(12) United States Patent
Hou et al.

(10) Patent No.: US 12,323,764 B2
(45) Date of Patent: Jun. 3, 2025

(54) LASER MICROPHONE AND TERMINAL

(71) Applicant: HUAWEI TECHNOLOGIES CO., LTD., Guangdong (CN)

(72) Inventors: Xiaoke Hou, Dongguan (CN); Shixiong Zhang, Dongguan (CN); Shengjie Ruan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 18/177,814

(22) Filed: Mar. 3, 2023

(65) Prior Publication Data

US 2023/0209278 A1    Jun. 29, 2023

Related U.S. Application Data

(63) Continuation of application No. PCT/CN2021/116172, filed on Sep. 2, 2021.

(30) Foreign Application Priority Data

Sep. 4, 2020 (CN) .......................... 202010924113.6

(51) Int. Cl.
*H04R 3/00* (2006.01)
*H04R 23/00* (2006.01)

(52) U.S. Cl.
CPC ............. *H04R 23/008* (2013.01); *H04R 3/00* (2013.01); *H04R 2430/00* (2013.01)

(58) Field of Classification Search
CPC ..... H04R 23/008; H04R 3/00; H04R 2430/00
USPC .................................................... 381/92, 122
See application file for complete search history.

(56) References Cited

U.S. PATENT DOCUMENTS

| 2004/0071383 | A1 | 4/2004 | Balachandran et al. |
| 2019/0090068 | A1* | 3/2019 | Fishman ............... H01S 5/0028 |
| 2019/0313178 | A1 | 10/2019 | Mutlu et al. |

FOREIGN PATENT DOCUMENTS

| CN | 203859873 U | 10/2014 |
| CN | 102833660 A | 12/2015 |
| CN | 107817009 A | 3/2018 |
| CN | 108106715 A | 6/2018 |
| CN | 109945964 A | 6/2019 |

(Continued)

OTHER PUBLICATIONS

Extended European Search Report for EP Application No. 21863652 dated Jan. 16, 2024, 8 pages.

(Continued)

*Primary Examiner* — George C Monikang

(57) ABSTRACT

The technology of this application relates to a laser microphone, including a diaphragm, a laser device, a control circuit, a self-mixing signal obtaining apparatus, and a signal processing circuit. The laser device is configured to emit light to the diaphragm and receive a feedback light signal from the diaphragm, and the feedback light signal interferes with laser in a resonant cavity of the laser device to obtain a self-mixing light signal. A distance between the laser device and the diaphragm ranges from 30 to 300 μm. The control circuit is connected to the laser device, and is configured to drive and control the laser device to emit light. The self-mixing signal obtaining apparatus is connected to the laser device, and is configured to obtain a target voltage signal related to the self-mixing light signal.

20 Claims, 11 Drawing Sheets

(56) References Cited

FOREIGN PATENT DOCUMENTS

| | | |
|---|---|---|
| CN | 110186548 A | 8/2019 |
| CN | 110602617 A | 12/2019 |

OTHER PUBLICATIONS

PCT International Search Report for Application No. PCT/CN2021/116172 dated Sep. 2, 2021, 10 pages.
Office Action issued in KR10-2023-7011121, dated Nov. 11, 2024, 6 pages.
Office Action issued on Mar. 1, 2025 in Chinese Application No. 202010924113.6, 10 pages.

* cited by examiner

LASER MICROPHONE AND TERMINAL

CROSS-REFERENCE TO RELATED APPLICATIONS

This application is a continuation of International Application No. PCT/CN2021/116172, filed on Sep. 2, 2021, which claims priority to Chinese Patent Application No. 202010924113.6, filed on Sep. 4, 2020. The disclosures of the aforementioned applications are hereby incorporated by reference in their entireties.

TECHNICAL FIELD

This application relates to the field of microphone technologies, and in particular, to a laser microphone and terminal.

BACKGROUND

Automatic voice recognition systems are increasingly applied to scenarios such as voice control and voice interaction. Meanwhile, more people record and share video content through the mobile Internet. Microphones used to pick up sound need to have good performance to ensure excellent user experience. A signal-to-noise ratio (SNR) of a microphone is a key parameter that affects the quality of picked up sound. A high SNR helps the microphone to maintain low background noise while amplifying a signal when picking up a long-distance, weak target source, thereby improving long-distance sound pickup quality.

Currently, a microelectromechanical systems (MEMS) microphone is mostly used in devices such as a mobile communications terminal and smart home to capture a voice signal. The microphone is composed of a MEMS capacitive sensor, an application specific integrated circuit (ASIC) conversion circuit, a sound cavity, and the like. A MEMS capacitor includes a silicon diaphragm for receiving sound and a silicon back electrode, the silicon diaphragm can sense air vibration generated by sound waves and vibrate accordingly, and form a variable capacitor with the silicon back electrode. The change of the variable capacitor under an external bias is detected through a circuit, and processed and converted into electrical signal output. Because a distance between the diaphragm and the silicon back electrode is small, high squeeze-film damping is introduced, and high mechanical noise is introduced, which limits the improvement of the SNR. In addition, due to pull-in effect between the silicon back electrode and the silicon diaphragm, a certain distance needs to be kept between them, so that the improvement of sensitivity and acoustic overload point is limited. Conventional MEMS microphones face a bottleneck of further improving the SNR. Therefore, to obtain a microphone with a higher SNR, to increase a voice recognition rate and an awakening rate and improve long-distance sound pickup effect, a new technical route needs to be explored.

SUMMARY

Embodiments of this application provide a laser microphone, which has a high signal-to-noise ratio, such that a voice recognition rate and an awakening rate thereof can be increased, and long-distance sound pickup effect is improved.

Specifically, a first aspect of the embodiments of this application provides a laser microphone, including a diaphragm, a laser device, a control circuit, a self-mixing signal obtaining apparatus, and a signal processing circuit.

The laser device is configured to emit light to the diaphragm, and receive a feedback light signal from the diaphragm, where the feedback light signal interferes with laser in a resonant cavity of the laser device to obtain a self-mixing light signal. A distance between the laser device and the diaphragm is L, where a range of L is 30 μm≤L≤300 μm.

The control circuit is connected to the laser device, and is configured to drive and control the laser device to emit light.

The self-mixing signal obtaining apparatus is connected to the laser device, and is configured to obtain and output a target voltage signal related to the self-mixing light signal.

The signal processing circuit is connected to the self-mixing signal obtaining apparatus, and is configured to receive the target voltage signal output by the self-mixing signal obtaining apparatus, and process the target voltage signal into an audio voltage signal.

According to the laser microphone provided in the embodiments of this application, a laser self-mixing device is configured to detect vibration of the diaphragm caused by a voice signal. The laser self-mixing device has a strong capability of detecting a weak vibration signal. Therefore, voice recognition sensitivity of the microphone can be improved. Additionally, a proper distance is set between the laser device and the diaphragm, and therefore the coupling efficiency of an output light beam of the laser device re-entering the resonant cavity of the laser device after being reflected by the diaphragm can be improved, effectively improving a signal-to-noise ratio of the laser microphone, and improving voice recognition sensitivity.

Fluctuation in a current of the laser device is caused due to reasons such as ambient temperature fluctuation and laser device aging. As a result, a light emitting frequency of the laser device drifts, and phase noise is introduced. To reduce or eliminate the phase noise and improve the signal-to-noise ratio of the laser microphone, in the embodiments of this application, a drive current of the laser device is further modulated by constructing a loop, stabilizing the laser device at a current operating point with the highest sensitivity. Specifically, in an implementation of this application, an output end of the self-mixing signal obtaining apparatus is connected to an input end of the control circuit, and the control circuit determines a drive current $A_j$ of the laser device based on the target voltage signal output by the self-mixing signal obtaining apparatus.

Current fluctuation of the laser device and vibration of the diaphragm will cause phase fluctuation in the resonant cavity of the laser device, that is, fluctuation of the self-mixing light signal. In the embodiments of this application, small current disturbance is applied to the laser device, and an operating point of the laser device with the highest sensitivity is determined according to a degree of change that is of a voltage signal output by the self-mixing signal obtaining apparatus and that is caused by the current disturbance, that is, a degree of change of the self-mixing light signal caused by the current disturbance. Therefore, the laser device can be kept at the operating point with the highest sensitivity to the vibration of the diaphragm, and the signal-to-noise ratio of the microphone can be improved.

In an implementation of this application, when a $j^{th}$ drive current modulation is performed in an operating mode of the laser device, that the control circuit determines a drive current $A_j$ of the laser device based on the target voltage signal output by the self-mixing signal obtaining apparatus includes:

S11: determining, by the control circuit based on a drive current $A_{j-1}$ obtained after previous drive current modulation, a scanning current range $[I_{min}, I_{max}]$ of current drive current modulation, where $I_{min}=A_{j-1}-I_0$, $I_{max}=A_{j-1}+I_0$, 0.1 mA≤$I_0$≤0.5 mA, and 0.1 mA≤$I_0$≤0.5 mA; and j represents a quantity of times of drive current modulation, and is an integer greater than or equal to 2;

S12: applying, by the control circuit, a scanning current $I_t$ to the laser device by using $I_{min}$ as an initial value, ΔI as a step size, and $I_{max}$ as an end value, superimposing an alternating current $I_c$ on the scanning current $I_t$ during each scanning, and obtaining a peak-to-peak value $ΔV_t$ of output voltage fluctuation in each scanning, where ΔI is a preset current; the alternating current $I_c$ is a preset current, and a frequency of the alternating current $I_c$ is greater than a maximum frequency of sound capable of being heard by a human ear; $ΔV_t$ is related to the frequency of the alternating current $I_c$; and t represents a quantity of times of current scanning; and S13: determining a scanning current $I_t$ corresponding to $ΔV_t$ of the largest value in a plurality of $ΔV_t$ obtained in the process of performing S12 as the drive current $A_j$ that is of the laser device and that is obtained through the current drive current modulation.

The foregoing drive current modulation is performed in the operating mode of the laser device, so that the laser device can always stabilize at a current operating point with the highest sensitivity in the entire operating process, thereby improving sound pickup quality and long-distance sound pickup effect of the laser microphone, and improving sound pickup stability of the laser microphone.

In an implementation of this application, when the laser device starts the operating mode, that the control circuit determines a drive current $A_j$ of the laser device based on the target voltage signal output by the self-mixing signal obtaining apparatus includes:

S21: applying, by the control circuit, a scanning current $I_{t'}$ to the laser device by using $I_{min'}$ as an initial value, ΔI as a step size, and $I_{max'}$ as an end value, superimposing an alternating current $I_c$ on the scanning current $I_{t'}$ during each scanning, and obtaining a peak-to-peak value $ΔV_{t'}$ of output voltage fluctuation in each scanning, where $I_{min'}$ is a preset minimum drive current, and $I_{max'}$ is a preset maximum drive current; ΔI is a preset current; the alternating current $I_c$ is a preset current, and a frequency of the alternating current $I_c$ is greater than a maximum frequency of sound capable of being heard by a human ear; $ΔV_{t'}$ is related to the frequency of the alternating current $I_c$; and t' represents a quantity of times of current scanning; and S22: determining a scanning current $I_{t'}$ corresponding to $ΔV_{t'}$ of the largest value in a plurality of $ΔV_{t'}$ obtained in the process of performing S21 as the drive current $A_j$ of the laser device.

When the laser device starts the operating mode, a current operating point of the laser device with the highest sensitivity is searched by scanning from a preset minimum drive current (generally a laser device threshold) to a preset maximum drive current, so that sound pickup quality and long-distance sound pickup effect of the laser microphone can be improved.

In an implementation of this application, a range of ΔI is 10 μA≤ΔI≤50 μA. Setting a proper step size helps to find a drive current point value with high sensitivity accurately.

In an implementation of this application, a frequency of the alternating current $I_c$, that is, a frequency of the applied current disturbance, is greater than a maximum frequency of sound capable of being heard by a human ear. Therefore, the current disturbance does not greatly affect stable operation of the laser device. In some implementations of this application, a frequency range of the alternating current $I_c$ is 20 kHz<$I_c$≤50 kHz. A peak-to-peak value of the alternating current $I_c$ may be controlled between 10 μA and 50 μA. Similarly, the influence on stable operation of the laser device can be reduced by applying the alternating current $I_c$ of a small current value.

In an implementation of this application, the self-mixing signal obtaining apparatus is configured to detect the self-mixing light signal in the resonant cavity of the laser device, and output the target voltage signal related to the self-mixing light signal.

In a specific implementation of this application, the self-mixing signal obtaining apparatus includes a photodetector and a transimpedance amplifier circuit, where the photodetector is connected to the laser device, and configured to detect the self-mixing light signal in the resonant cavity of the laser device and convert the self-mixing light signal into a current signal; and the transimpedance amplifier circuit is connected to the photodetector, and configured to convert the current signal into the target voltage signal. By using the photodetector and the transimpedance amplifier circuit to obtain the self-mixing signal, a higher signal-to-noise ratio can be obtained by increasing the drive current of the laser device.

In an implementation of this application, the photodetector and the laser device are monolithically integrated on one chip, and the photodetector is located on a side of the laser device away from the diaphragm, that is, the back of a light emitting surface of the laser device. The laser device and the photodetector are integrated on the same chip, so that efficiency of coupling light transmitted from the back of the laser device into the photodetector can be improved, thereby improving the signal-to-noise ratio, and at the same time, optical path deviation caused by the discrete arrangement in the case of vibration, drop, and the like can be avoided. This keeps signal consistent throughout the life cycle of the microphone.

In another implementation of this application, the self-mixing signal obtaining apparatus includes a snubber circuit connected to the laser device, where the snubber circuit is configured to obtain a terminal voltage of the laser device, and the terminal voltage of the laser device is related to the self-mixing light signal. A target voltage signal related to the self-mixing light signal is obtained by obtaining a terminal voltage of the laser device, so that a moderate signal-to-noise ratio can be obtained under a small drive current of the laser device (that is, small power consumption).

In an implementation of this application, the signal processing circuit includes a high-pass filter circuit and a voltage amplification and low-pass filter circuit, where the high-pass filter circuit is connected to the self-mixing signal obtaining apparatus, and the voltage amplification and low-pass filter circuit is connected to the high-pass filter circuit. The high-pass filter circuit and the voltage amplification and low-pass filter circuit can filter low-frequency background sound and high-frequency signals.

In some implementations of this application, the signal processing circuit further includes a gain control circuit connected to the voltage amplification and low-pass filter circuit, where the gain control circuit is configured to adjust the gain of the voltage amplification and low-pass filter circuit based on an output signal of the voltage amplification and low-pass filter circuit. The disposing of the gain control circuit can realize adjustable gain of the voltage amplification and low-pass filter circuit.

In an implementation of this application, a light beam coupling apparatus is disposed on a light emitting surface that is of the laser device and that faces the diaphragm, where the light beam coupling apparatus includes one or more lenses. The disposing of the lenses can improve the coupling efficiency of an output light beam of the laser device re-entering the resonant cavity of the laser device after being reflected by the diaphragm, and has higher feedback light intensity, that is, a stronger signal, thereby further effectively improving the signal-to-noise ratio of the microphone.

In an implementation of this application, a horizontal dimension (that is, length and width dimensions) of each lens ranges from 20 μm to 200 μm; and a longitudinal dimension (that is, a height dimension) of each lens ranges from 20 μm to 200 μm. A lens of the foregoing dimension may be processed by means of laser direct writing or micro-nano printing, and a lens of the foregoing dimension may be integrated on the laser device to implement more compact assembly, and a mass production solution of direct production on a wafer may be implemented.

In an implementation of this application, a specific type of the diaphragm is not limited, and there is no special requirement for conductivity. Only a vibration characteristic required by audio needs to be considered. The diaphragm may be various diaphragms available for an existing microphone. Specifically, a MEMS diaphragm, a metal glass diaphragm, a graphene diaphragm, a polymer film, a metal film, or the like may be included.

In an implementation of this application, a reflection layer is disposed on a side that is of the diaphragm and that faces the laser device. The reflectivity of the reflection layer is greater than 70%. Specifically, the reflection layer may be made of gold, aluminum, or the like. The arrangement of the reflection layer can improve the reflectivity of the output light beam of the laser device reflected back into the resonant cavity of the laser device when emitted to the diaphragm. In addition, to control the overall stress of the diaphragm within a small range and improve sound pressure displacement sensitivity, the diaphragm is generally a composite film structure including different stress film layers. In this way, in addition to increasing reflectivity by the arrangement of the metal reflection layer, it can also compensate negative stress of the diaphragm and improve the stability of the diaphragm.

In an implementation of this application, the laser device is a self-mixing laser device, and a specific type thereof is not limited. The laser device may be a vertical cavity surface emitting laser, or may be an edge emitting laser. An output wavelength of the laser device may range from 750 nm to 1600 nm.

In an implementation of this application, the laser microphone further includes a housing, where the diaphragm, the laser device, the control circuit, the self-mixing signal obtaining apparatus, and the signal processing circuit are all disposed in the housing, and a sound pickup hole is disposed at a position corresponding to the diaphragm on the housing. External sound information is picked up through the sound pickup hole.

An embodiment of this application further provides a terminal. The terminal includes the laser microphone according to the first aspect of the embodiments of this application. The terminal includes an external housing and a circuit board disposed in the external housing, and the laser microphone is disposed on the circuit board. A sound receiving hole corresponding to a position of the laser microphone is disposed on the external housing of the terminal, and external sound is transmitted to the laser microphone through the sound receiving hole of the external housing. The laser microphone may be disposed corresponding to a front side of the terminal, or may be disposed corresponding to a rear side of the terminal, or may be disposed corresponding to a side middle frame of the terminal. The terminal may be a terminal product in scenarios in which voice command control is required or voice needs to be captured, recorded, processed, or analyzed, such as a mobile phone, a notebook computer, a tablet computer, a smart TV, a smart speaker, a headset, a video camera, a network camera, a wearable device, a game device, an in-vehicle audio system or microphone, a voice navigation device, a dictation voice recognition device, a voice-to-text converter, or the like.

The laser microphone provided in the embodiments of this application detects, based on a laser self-mixing device, vibration of the diaphragm caused by a voice signal, and has a strong capability of detecting a weak vibration signal. Compared with a conventional MEMS microphone, the laser microphone has a higher signal-to-noise ratio. According to the laser microphone in the embodiments of this application, a proper distance is set between the laser device and the diaphragm, so that the coupling efficiency of an output light beam of the laser device re-entering the resonant cavity of the laser device after being reflected by the diaphragm is improved, thereby effectively improving a signal-to-noise ratio, and improving voice recognition sensitivity. In addition, according to the laser microphone in the embodiments of this application, a drive current of the laser device is modulated by constructing a loop, stabilizing the laser device at an operating point with the highest sensitivity, which can reduce or eliminate phase noise caused by current fluctuation, so that the laser microphone can maintain a high signal-to-noise ratio during operation and in the entire life cycle. According to the embodiments of this application, the laser microphone can significantly improve voice pickup in a soft-spoken mode in a quiet scenario, detection of a long-distance weak voice signal, and voice pickup quality during long-distance video recording, thereby improving user experience.

DESCRIPTION OF EMBODIMENTS

The following describes embodiments of this application with reference to the accompanying drawings in embodiments of this application.

Figure 1:
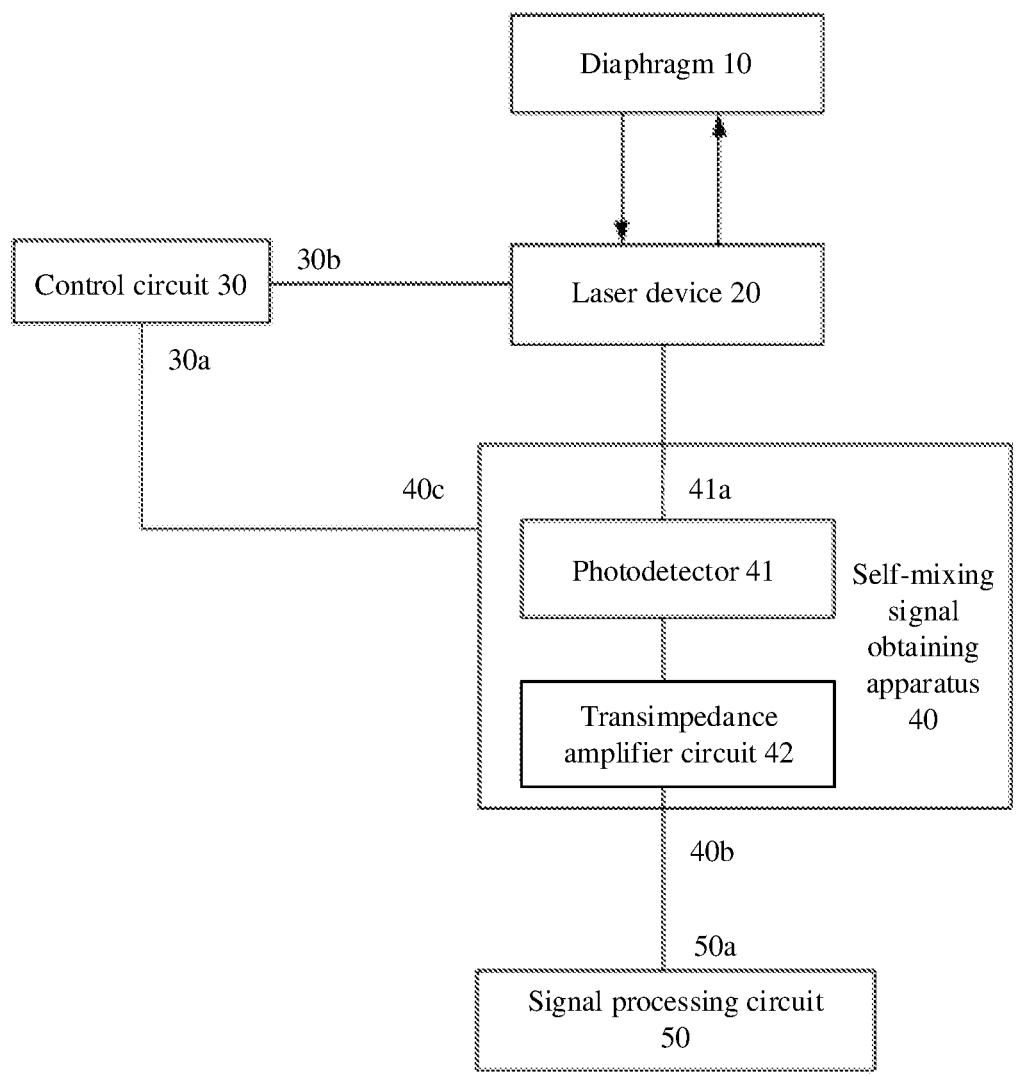
FIG. 1 is an example schematic diagram of a circuit structure of a laser microphone according to an embodiment of this application.
Figure 2:
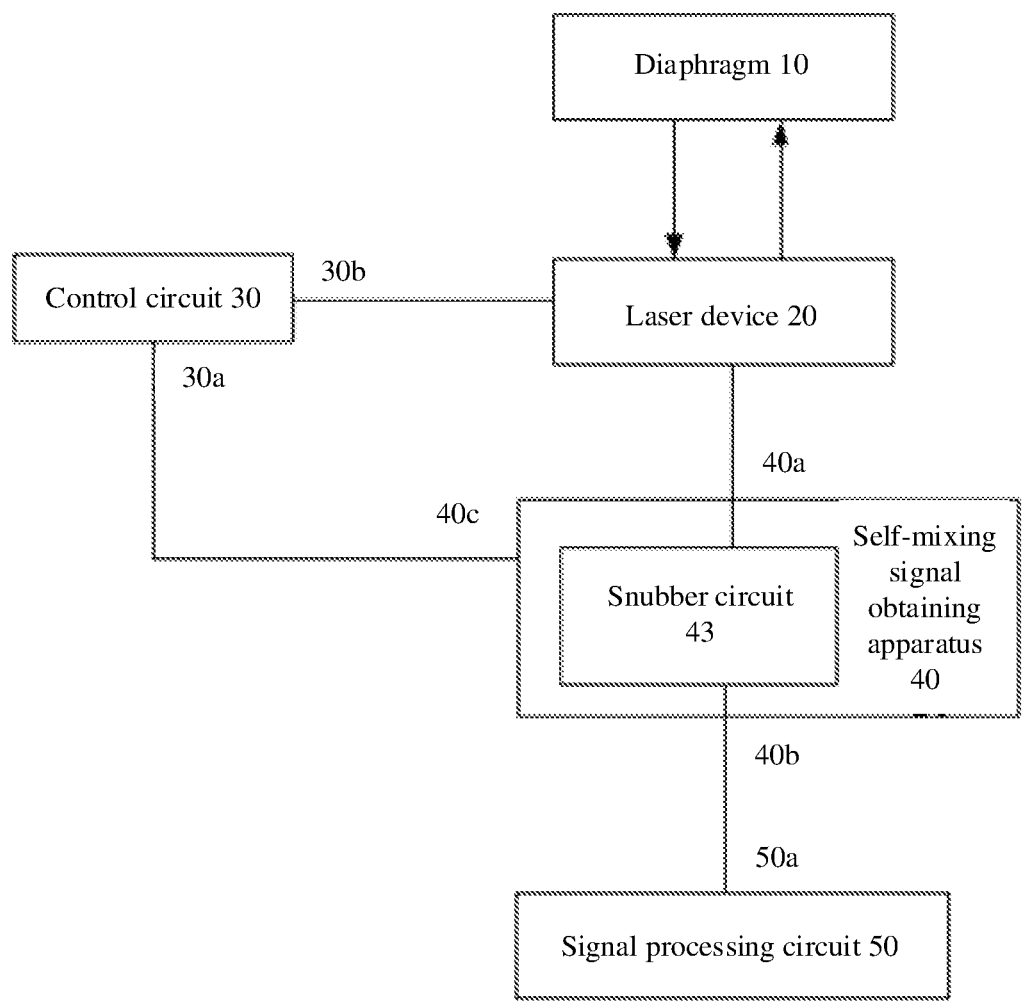
FIG. 2 is an example schematic diagram of a circuit structure of a laser microphone according to another embodiment of this application.

Referring to FIG. 1 and FIG. 2, an embodiment of this application provides a laser microphone 100, including a diaphragm 10, a laser device 20, a control circuit 30, a self-mixing signal obtaining apparatus 40, and a signal processing circuit 50. The diaphragm 10 is configured to receive sound waves generated by external sound and generate vibration, a side of the laser device 20 on which a light emitting surface is located is opposite to the diaphragm 10, and the laser device 20 is configured to emit light to the diaphragm 10 and receive a feedback light signal from the diaphragm 10. Based on a laser self-mixing interference effect, the feedback light signal interferes with laser in a resonant cavity of the laser device 20 to obtain a self-mixing light signal. An output end 30b of the control circuit 30 is connected to the laser device 20, and the control circuit 30 is configured to drive and control the laser device 20 to emit light. The self-mixing signal obtaining apparatus 40 is connected to the laser device 20, and the self-mixing signal obtaining apparatus 40 is configured to obtain a target voltage signal related to the self-mixing light signal. An input end 50a of the signal processing circuit 50 is connected to a first output port 40b of the self-mixing signal obtaining apparatus 40, and is configured to receive the target voltage signal output by the self-mixing signal obtaining apparatus 40, and process the target voltage signal into an audio voltage signal.

An operating mechanism of the laser microphone 100 in the embodiments of this application is as follows: A sound wave generated by external sound acts on the diaphragm 10, and the diaphragm 10 generates a vibration displacement as sound pressure of the sound wave changes. The control circuit 30 provides a drive current to the laser device 20 to drive the laser device 20 to emit light, and a laser beam is emitted to the diaphragm 10 and reflected by the diaphragm 10 to obtain a feedback light signal, where the feedback light signal carries vibration information of the diaphragm 10 and changes a phase relative to the emitted light. The feedback light signal is reflected back to the resonant cavity of the laser device 20, and self-mixing interference occurs with laser in the cavity, to obtain a self-mixing light signal. The self-mixing signal obtaining apparatus 40 obtains a target voltage signal related to the self-mixing light signal of the laser device 20, and the signal processing circuit 50 receives the target voltage signal output by the self-mixing signal obtaining apparatus 40, and performs processing such as amplification and filtering on the target voltage signal to obtain a finally output audio voltage signal.

In an implementation of this application, a distance between the laser device 20 and the diaphragm 10 is L, where a range of L is 30 μm≤L≤300 μm. That is, a distance between the light emitting surface on a side of the laser device 20 close to the diaphragm 10 and a reflection surface of the diaphragm 10 ranges from 30 μm to 300 μm. The distance between the light emitting surface of the laser device 20 and the reflection surface of the diaphragm 10 may be considered as an equivalent external cavity. A vibration displacement of the surface of the diaphragm 10 in the direction of the laser beam changes the length of an external reflection cavity formed by the reflection surface of the diaphragm and the light emitting surface of the laser device, and further changes the phase of the feedback light. In the embodiments of this application, a proper distance is set between the laser device and the diaphragm, that is, a proper length of the external cavity is maintained, so that the coupling efficiency of an output light beam of the laser device re-entering the resonant cavity of the laser device after being reflected by the diaphragm is improved, thereby effectively improving a signal-to-noise ratio, and improving voice recognition sensitivity.

In some implementations of this application, the self-mixing signal obtaining apparatus 40 is configured to obtain the self-mixing light signal in the resonant cavity of the laser device 20, and output the target voltage signal related to the self-mixing light signal. Specifically, as shown in FIG. 1, the self-mixing signal obtaining apparatus 40 includes a photodetector 41 and a transimpedance amplifier circuit 42, where the photodetector 41 is connected to the laser device 20, and an input end of the transimpedance amplifier circuit 42 is electrically connected to the photodetector 41. The photodetector 41 is configured to detect the self-mixing light signal in the resonant cavity of the laser device and convert the self-mixing light signal into a current signal, and the transimpedance amplifier circuit 42 is configured to convert the current signal output by the photodetector 41 into a voltage signal. In this implementation, the feedback light signal obtained through reflection by the diaphragm is reflected back to the resonant cavity of the laser device 20, and self-mixing interference occurs with the optical field in the cavity, which causes a change of light intensity of the laser device. The change of the light intensity caused by self-mixing is detected by the photodetector 41, and the photodetector 41 converts a light signal into a photocurrent signal. The transimpedance amplifier circuit 42 converts the photocurrent signal into an amplified target voltage signal. Then, the signal processing circuit 50 performs processing such as signal amplification and filtering, and finally outputs the signal as an audio voltage signal.

In some other implementations of this application, the self-mixing signal obtaining apparatus 40 is configured to directly obtain the target voltage signal related to the self-mixing light signal from the laser device 20. Specifically, as shown in FIG. 2, the self-mixing signal obtaining apparatus 40 includes a snubber circuit 43 connected to an output end of the laser device 20. The snubber circuit 43 may obtain a terminal voltage of the laser device 20. In this application, the terminal voltage of the laser device 20 refers to a voltage difference between two ends of the laser device or a voltage of one end of the laser device relative to the ground. The snubber circuit 43 is a protection circuit that can suppress a current rise.

Figure 3:
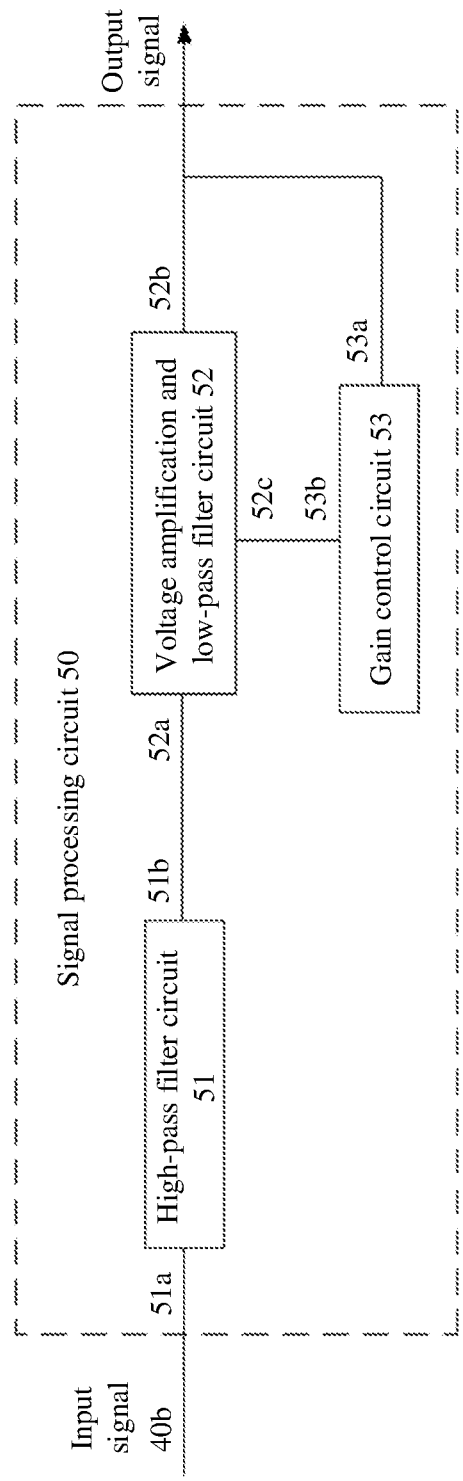
FIG. 3 is an example schematic structural diagram of a signal processing circuit 50 according to an embodiment of this application.

Referring to FIG. 3, in some implementations of this application, the signal processing circuit 50 includes a high-pass filter circuit 51 and a voltage amplification and low-pass filter circuit 52. An input terminal 51a of the high-pass filter circuit 51 is connected to a first output port 40b of the self-mixing signal obtaining apparatus 40. An input terminal 52a of the voltage amplification and low-pass filter circuit 52 is connected to an output terminal 51b of the high-pass filter circuit 51. The high-pass filter circuit 51 may DC block an output signal of the self-mixing signal obtaining apparatus 40, and filter out low-frequency noise. The voltage amplification and low-pass filter circuit 52 may perform amplification and low-pass filtering processing on a DC-blocked high-frequency alternating current signal output by the high-pass filter circuit 51. In some implementations of this application, the signal processing circuit 50 may further include a gain control circuit 53. An input terminal 53a of the gain control circuit 53 is connected to an output terminal 52b of the voltage amplification and low-pass filter circuit 52. An output terminal 53b of the gain control circuit 53 is connected to an input terminal 52c of the voltage amplification and low-pass filter circuit 52. The gain control circuit 53 adjusts the gain of the voltage amplification and low-pass filter circuit 52 based on an output signal of the voltage amplification and low-pass filter circuit 52. The output terminal 52b of the voltage amplification and low-pass filter circuit 52 serves as an output end of the signal processing circuit 50 and outputs a signal.

Fluctuation in a current of the laser device is caused due to reasons such as ambient temperature fluctuation and laser device aging. As a result, a light emitting frequency of the laser device drifts, and phase noise is introduced. To reduce or eliminate the phase noise and improve the signal-to-noise ratio of the microphone, in the embodiments of this application, a drive current of the laser device is modulated by constructing a loop, stabilizing the laser device at an operating point of the drive current with the highest sensitivity to vibration of the diaphragm. Current fluctuation of the laser device and vibration of the diaphragm will cause phase fluctuation in the resonant cavity of the laser device, that is, fluctuation of the self-mixing light signal. In the embodiments of this application, small current disturbance is applied to the laser device, and an operating point of the drive current of the laser device with the highest sensitivity is determined according to a degree of change that is of an output signal of the self-mixing signal obtaining apparatus and that is caused by the current disturbance, that is, a degree of change of the self-mixing light signal caused by the current disturbance. Therefore, the laser device can also be kept at the operating point of the drive current with the highest sensitivity to the vibration of the diaphragm, and the signal-to-noise ratio of the microphone can be improved. In this application, the drive current of the laser device is a direct current.

The following describes a specific solution in which the drive current of the laser device is modulated by constructing a loop according to the embodiments of this application.

Referring to FIG. 1 and FIG. 2, in an implementation of this application, a second output port 40c of the self-mixing signal obtaining apparatus 40 is connected to an input terminal 30a of the control circuit 30. The control circuit 30 determines the drive current $A_j$ of the laser device 20 according to an output signal from the second output port 40c of the self-mixing signal obtaining apparatus 40. That is, two signals are output from the self-mixing signal obtaining apparatus 40, one signal is output to the signal processing circuit 50, the other signal is output to the control circuit 30, and the two signals are same voltage signals.

In an implementation of this application, when the laser device starts an operating mode, that the control circuit 30 determines a drive current $A_j$ of the laser device 20 based on the target voltage signal output by the self-mixing signal obtaining apparatus 40 includes the following steps.

S21: The control circuit applies a scanning current $I_{t'}$ to the laser device by using $I_{min'}$ as an initial value, $\Delta I$ as a step size, and $I_{max'}$ as an end value, superimposes an alternating current $I_c$ on the scanning current $I_{t'}$ during each scanning, and obtains a peak-to-peak value $\Delta V_{t'}$ of output voltage fluctuation in each scanning, where $I_{min'}$ is a preset minimum drive current, and $I_{max'}$ is a preset maximum drive current; $\Delta I$ is a preset current; the alternating current $I_c$ is a preset current, and a frequency of the alternating current $I_c$ is greater than a maximum frequency of sound capable of being heard by a human ear; $\Delta V_{t'}$ is related to the frequency of the alternating current $I_c$; and t' represents a quantity of times of current scanning.

In step S21 of this embodiment, the control circuit 30 superimposes the alternating current $I_c$ on the scanning current $I_{t'}$ during each scanning and outputs a current obtained after superimposing to the laser device 20, and the self-mixing signal obtaining apparatus 40 outputs a target voltage signal $V_1$ based on $I_{t'}$ and $I_c$. After obtaining the target voltage signal $V_1$, the control circuit 30 performs FFT (Fast Fourier Transform, fast fourier transform) on the target voltage signal $V_1$, and identifies a peak-to-peak value $\Delta V_{t'}$ of output voltage fluctuation at the frequency of the alternating current $I_c$. That $\Delta V_{t'}$ is related to the frequency of the alternating current $I_c$ means that, according to the frequency of the superimposed alternating current $I_c$, a peak-to-peak value $\Delta V_{t'}$ of output voltage fluctuation at the frequency is identified in the voltage signal on which the FFT is performed. For example, if the frequency of the superimposed alternating current $I_c$ is 25 kHz, a peak-to-peak value $\Delta V_{t'}$ of output voltage fluctuation at the frequency of 25 kHz needs to be identified.

In an implementation of this application, the preset minimum drive current $I_{min'}$ and the preset maximum drive current $I_{max'}$ of the laser device may be properly set based on a specific requirement of the laser device. For example, in some implementations of this application, the preset minimum drive current $I_{min'}$ may be 0.5 mA, and the preset maximum drive current $I_{max'}$ may be 3 mA.

One time of scanning refers to a process in which the control circuit superimposes the alternating current $I_c$ on the scanning current $I_t$ of a certain point value, applies the obtained current to the laser device, and obtains a peak-to-peak value $\Delta V_{t'}$ of output voltage fluctuation of the laser device when the alternating current $I_c$ is superimposed under the action of the scanning current $I_t$. The peak-to-peak (peak-to-peak, pk-pk) $\Delta V_{t'}$ refers to a difference between the largest positive voltage value and the largest negative voltage value in a waveform diagram.

S22: Determine a scanning current $I_{t'}$ corresponding to $\Delta V_{t'}$ of the largest value in a plurality of $\Delta V_{t'}$ obtained in the process of performing S21 as the drive current $A_j$ of the laser device. The control circuit stably applies the drive current $A_j$ to the laser device according to the drive current $A_j$ determined in S22.

That the laser device starts an operating mode refers to a process in which the laser device starts a sound pickup mode from a mode of disabling sound pickup each time. A duration from power-on to power-off of the laser device is defined as one period. Starting the sound pickup mode after each power-on is always starting the operating mode. In one period, a process of switching from a stand-by mode to the sound pickup mode is also considered as starting the operating mode. The operating mode of the laser device refers to the sound pickup mode of the laser device, that is, a sound pickup mode state after the laser device starts the operating mode.

In an implementation of this application, when a $j^{th}$ drive current modulation is performed in an operating mode of the laser device, that the control circuit 30 determines a drive current $A_j$ of the laser device 20 based on the target voltage signal output by the self-mixing signal obtaining apparatus 40 includes the following steps.

S11: The control circuit determines, based on a drive current $A_{j-1}$ obtained after previous drive current modulation, a scanning current range $[I_{min}, I_{max}]$ of current drive current modulation, where $I_{min}=A_{j-1}-I_0$, $I_{max}=A_{j-1}+I_0$, 0.1 mA≤$I_0$≤0.5 mA, and 0.1 mA≤$I_0$≤0.5 mA; and j represents a quantity of times of drive current modulation, and is an integer greater than or equal to 2.

In step S11, when j is equal to 2, that is, during the first drive current modulation after the laser device starts the operating mode, the drive current $A_{j-1}$ obtained after the previous drive current modulation is a drive current determined after S21 and S22 are performed when the operating mode is started. When j is greater than 2, the drive current $A_{j-1}$ obtained after the previous drive current modulation may be a drive current determined previously after S11 to S13 are performed in the operating mode of the laser device. Before the next drive current modulation is performed, the control circuit continuously applies, to the laser device, a drive current obtained after a previous drive current modulation is performed. Therefore, a drive current obtained after a previous drive current modulation of the laser device is usually a current operating drive current of the laser device.

In an implementation of this application, $I_0$ and $I_{0'}$ may have a same value, or may have different values. In some implementations of this application, the scanning current range $[I_{min}, I_{max}]$ is determined to be within a range of plus or minus 0.3 mA of the current operating current, that is, $I_{min}=A_{j-1}-0.3$ mA, and $I_{max}=A_{j-1}+0.3$ mA. In some other implementations, the scanning current range $[I_{min}, I_{max}]$ may alternatively be determined within a range of plus or minus 0.4 mA or a range of plus or minus 0.5 mA of the current operating current. Specifically, the range may be set according to a current fluctuation situation of the laser device.

In an implementation of this application, a value of $I_{max}$ is to be less than or equal to $I_{max'}$, and a value of $I_{min}$ is greater than or equal to $I_{min'}$.

Therefore, if the scanning current range $[I_{min}, I_{max}]$ is pre-determined to be within a range of plus or minus 0.3 mA of the current operating current, that is, $I_{min}=A_{j-1}-0.3$ mA, and $I_{max}=A_{j-1}+0.3$ mA, when $A_{j-1}+0.3$ mA is less than or equal to the preset maximum drive current $I_{max'}$, it is determined that $I_{max}=A_{j-1}+0.3$ mA; and when $A_{j-1}+0.3$ mA is greater than the preset maximum drive current $I_{max'}$, it is determined that $I_{max}=I_{max'}$. Similarly, when $A_{j-1}-0.3$ mA is greater than or equal to the preset minimum drive current $I_{min'}$, it is determined that $I_{min}=A_{j-1}-0.3$ mA; and when $A_{j-1}-0.3$ mA is less than the preset minimum drive current $I_{min'}$, it is determined that $I_{min}=I_{min'}$.

S12: The control circuit applies a scanning current $I_t$ to the laser device by using $I_{min}$ as an initial value, $\Delta I$ as a step size, and $I_{max}$ as an end value, superimposes an alternating current $I_c$ on the scanning current $I_t$ during each scanning, and obtains a peak-to-peak value $\Delta V_t$ of output voltage fluctuation in each scanning, where $\Delta I$ is a preset current; the alternating current $I_c$ is a preset current, and a frequency of the alternating current $I_c$ is greater than a maximum frequency of sound capable of being heard by a human ear; $\Delta V_t$ is related to the frequency of the alternating current $I_c$; and t represents a quantity of times of current scanning.

In step S12 of this embodiment, the control circuit 30 superimposes the alternating current $I_c$ on the scanning current $I_t$ during each scanning and outputs a current obtained after superimposing to the laser device 20, and the self-mixing signal obtaining apparatus 40 outputs a target voltage signal $V_1$ based on $I_t$ and $I_c$. After obtaining the target voltage signal $V_1$, the control circuit 30 performs FFT on the target voltage signal $V_1$, and identifies a peak-to-peak value $\Delta V_t$ of output voltage fluctuation at the frequency of the alternating current $I_c$. That $\Delta V_t$ is related to the frequency of the alternating current $I_c$ means that, according to the frequency of the superimposed alternating current $I_c$, a peak-to-peak value $\Delta V_t$ of output voltage fluctuation at the frequency is identified in the voltage signal on which the FFT is performed. For example, if the frequency of the superimposed alternating current $I_c$ is 25 kHz, a peak-to-peak value $\Delta V_t$ of output voltage fluctuation at the frequency of 25 kHz needs to be identified.

One time of scanning refers to a process in which the control circuit superimposes the alternating current $I_c$ on the scanning current $I_t$ of a certain point value, applies the obtained current to the laser device, and obtains a peak-to-peak value $\Delta V_t$ of output voltage fluctuation of the laser device when the alternating current $I_c$ is superimposed under the action of the scanning current $I_t$.

S13: Determine a scanning current $I_t$ corresponding to $\Delta V_t$ of the largest value in a plurality of $\Delta V_t$ obtained in the process of performing S12 as the drive current $A_j$ that is of the laser device and that is obtained through the current drive current modulation. Larger $\Delta V_t$ indicates a greater degree of change of the self-mixing light signal caused by alternating current disturbance of the laser device, that is, higher sensitivity of the self-mixing light signal to the current disturbance of the laser device. Current disturbance of the laser device and vibration of the diaphragm will cause phase fluctuation in the cavity of the laser device, that is, fluctuation of the self-mixing light signal. Therefore, a larger $\Delta V_t$ indicates higher sensitivity of the self-mixing light signal to the vibration of the diaphragm.

In an implementation of this application, one time of drive current modulation refers to a process in which the control circuit completes scanning of the drive current of the laser device from $I_{min}$ to $I_{max}$, superimposes the alternating current $I_c$ on each scanning current point $I_t$ at the same time, and obtains, according to a peak-to-peak value of output voltage fluctuation obtained in each scanning, a drive current of the laser device determined in the current modulation, that is, a process of completing S11 to S13 once. Similarly, a process of completing S21 to S22 once is considered as one time of drive current modulation.

In an implementation of this application, in the operating mode of the laser device, the drive current modulation process of S11 to S13 may be performed at an interval of 2 to 20 seconds, for example, once every 5 seconds, or once every 10 seconds. This may be specifically determined based on an actual operating status of the laser device. This is not limited in this application. If the current of the laser device is stable, an interval between two times of current modulation may be longer, and if the current of the laser device is unstable, an interval between two times of current modulation may be shorter.

It may be understood that the drive current modulation process of S21 to S22 may also be used for drive current modulation in the operating mode of the laser device. However, compared with the drive current modulation process of S11 to S13, a scanning current range is larger, and it is not conducive to quickly finding an operating current point with the highest sensitivity in the operating mode.

In an implementation of this application, a range of the preset current $\Delta I$ may be 10 μA≤$\Delta I$≤50 μA. Specifically, a value of $\Delta I$ may be, but is not limited to, 10 μA, 20 μA, 25

µA, 30 µA, 40 µA, or 50 µA. Setting a proper step size ΔI in a current scanning process helps to find a drive current point value with high sensitivity accurately.

In an implementation of this application, the frequency of the alternating current $I_c$ is greater than the maximum frequency of sound capable of being heard by a human ear. Because a frequency of sound capable of being heard by a human ear generally ranges from 20 Hz to 20 kHz, the frequency of the alternating current $I_c$ is greater than 20 kHz, and may be specifically 20 kHz<$I_c$≤50 kHz. In some implementations of this application, the frequency of the alternating current $I_c$ is 25 kHz, 30 kHz, 40 kHz, or 50 kHz. In an implementation of this application, a peak-to-peak value of the alternating current $I_c$ may be controlled between 10 µA and 50 µA, and may be specifically, but is not limited to, 10 µA, 20 µA, 30 µA, 40 µA, or 50 µA. The high frequency and small peak-to-peak value of the alternating current $I_c$ are beneficial to the stable operation of the laser device.

In an implementation of this application, a sampling frequency at which the control circuit 30 captures an output signal from an output end of the self-mixing signal obtaining apparatus 40 may be between 100 kHz and 500 kHz, for example, 100 kHz, 200 kHz, 300 kHz, or 500 kHz.

In a specific embodiment of this application, when the laser microphone starts the operating mode, a process in which the control circuit determines the drive current of the laser device through current modulation is as follows.

S101: Activate drive current modulation of the laser device, and set a peak-to-peak value of the alternating current $I_c$ to 17 µA, and a modulation frequency to 25 kHz; set an initial scanning current value of the laser device, that is, set the preset minimum drive current $I_{min}$, to 0.5 mA; set a scanning current end value of the laser device, that is, set the preset maximum drive current $I_{max}$, to 3 mA; and set a scanning step size ΔI of the drive current of the laser device to 25 µA.

S102: Increase the drive current of the laser device from 0.5 mA to 3 mA, and superimpose an alternating current of 17 µA on the scanning current during each scanning; and simultaneously obtain, by the control circuit, a target voltage signal output through each scanning from an output end of the self-mixing signal obtaining apparatus at a sampling frequency of 200 kHz, perform FFT on the obtained target voltage signal, and identify a peak-to-peak value $\Delta V_t$, of output voltage fluctuation at a modulation frequency of 25 kHz.

During the first scanning, the current output by the control circuit to the laser device includes a scanning current of 0.5 mA and the alternating current of 17 µA. During the second scanning, the current output by the control circuit to the laser device includes a scanning current of 0.5 mA+ΔI=0.525 mA and the alternating current of 17 µA. During the third scanning, the current output by the control circuit to the laser device includes a scanning current of 0.525 mA+ΔI=0.55 mA and the alternating current of 17 µA. The rest is deduced by analogy until the scanning current reaches 3 mA.

S103: Search for a value of the current of the laser device when $\Delta V_t$, has the largest value at the modulation frequency of 25 kHz in the process of increasing the scanning current from 0.5 mA to 3 mA; and set the drive current of the laser device to the value of the scanning current when $\Delta V_t$, has the largest value, and disable modulation.

After the modulation process of S101 to S103, the laser device finds the optimal operating point of the drive current with the highest sensitivity, and stabilizes the drive current of the laser device at the optimal operating point before next drive current modulation. In an implementation of this application, the foregoing modulation process is controlled and executed by the control circuit 30. When the modulation is disabled, the control circuit 30 stops capturing the target voltage signal from the self-mixing signal obtaining apparatus 40.

In this application, in the operating mode of the laser microphone, when a $j^{th}$ drive current modulation is performed, scanning may not be performed from the preset minimum drive current to the preset maximum drive current, and it is only need to determine a proper scanning range based on the current operating current. This can simplify a drive current modulation process.

In a specific embodiment of this application, in the operating mode of the laser microphone, a process of performing the $j^{th}$ drive current modulation may be as follows.

S201: Activate drive current modulation of the laser device, and set a peak-to-peak value of the alternating current $I_c$ to 17 µA, and a modulation frequency to 25 kHz; and determine an initial scanning current value $I_{min}$=2.3 mA— 0.3 mA=2.0 mA and a scanning current end value $I_{max}$=2.3 mA+0.3 mA=2.6 mA according to a current operating current $I_1$=2.3 mA of the laser device, and set a scanning step size ΔI of the drive current of the laser device to 25 µA, where the current operating current $I_1$ of the laser device is actually the drive current $I_{j-1}$ determined last time, that is, the $(j-1)^{th}$ modulation.

It should be noted that, if the current operating current Ii of the laser device is equal to 2.75 mA, $I_1$+0.3 mA>3 mA. In this case, the scanning current end value $I_{max}$ is determined to be 3 mA.

S202: Increase the drive current of the laser device from 2.0 mA to 2.6 mA, and superimpose an alternating current of 17 µA on the scanning current during each scanning; and simultaneously obtain, by the control circuit, a target voltage signal output through each scanning from an output end of the self-mixing signal obtaining apparatus at a sampling frequency of 200 kHz, perform FFT on the obtained target voltage signal, and identify a peak-to-peak value $\Delta V_t$ of output voltage fluctuation at a modulation frequency of 25 kHz.

During the first scanning, the current output by the control circuit to the laser device includes a scanning current of 2.0 mA and the alternating current of 17 µA. During the second scanning, the current output by the control circuit to the laser device includes a scanning current of 2.0 mA+ΔI=2.025 mA and the alternating current of 17 µA. During the third scanning, the current output by the control circuit to the laser device includes a scanning current of 2.025 mA+ΔI=2.05 mA and the alternating current of 17 µA. The rest is deduced by analogy until the scanning current reaches 26 mA.

S203: Search for a value of the current of the laser device when $\Delta V_t$ has the largest value at the modulation frequency of 25 kHz in a process of increasing the scanning current from 2.0 mA to 2.6 mA; and set the drive current of the laser device to the value of the scanning current when $\Delta V_t$ has the largest value, and disable modulation.

In the embodiments of this application, the drive current of the laser device is modulated by constructing a loop, so that an operating status of the laser device can be adjusted in real time, the laser device can be stabilized at an operating point with high sensitivity, and low-frequency phase jitter related to the environment is reduced or eliminated, which enables that a feedback interference mechanism of the self-mixing laser device is more stable. This allows the laser microphone to maintain a high signal-to-noise ratio during operation (that is, in the operating mode) and throughout its life cycle.

Figure 4A:
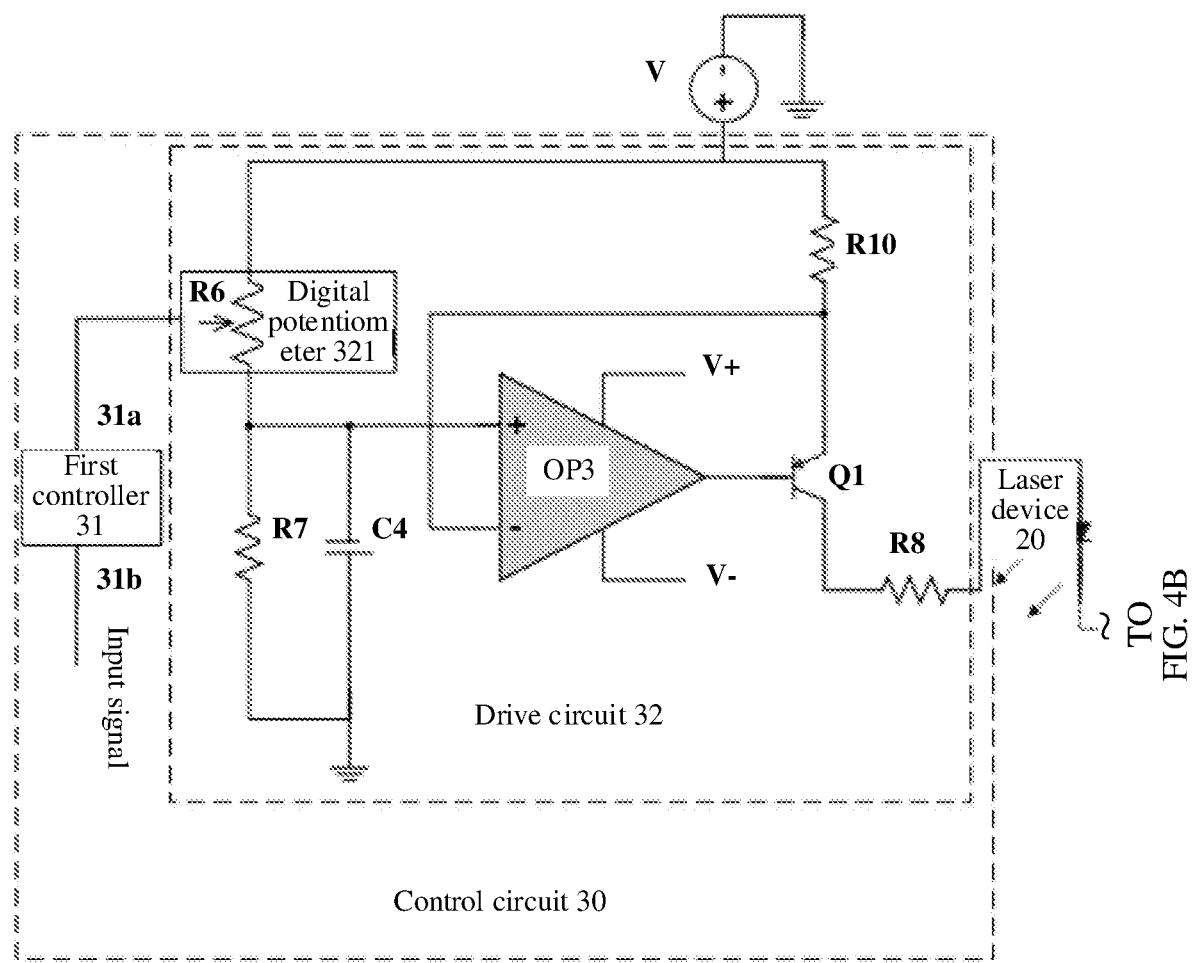
FIG. 4A to FIG. 4C are example schematic diagrams of a circuit structure of a laser microphone according to an embodiment of this application.
Figure 5A:
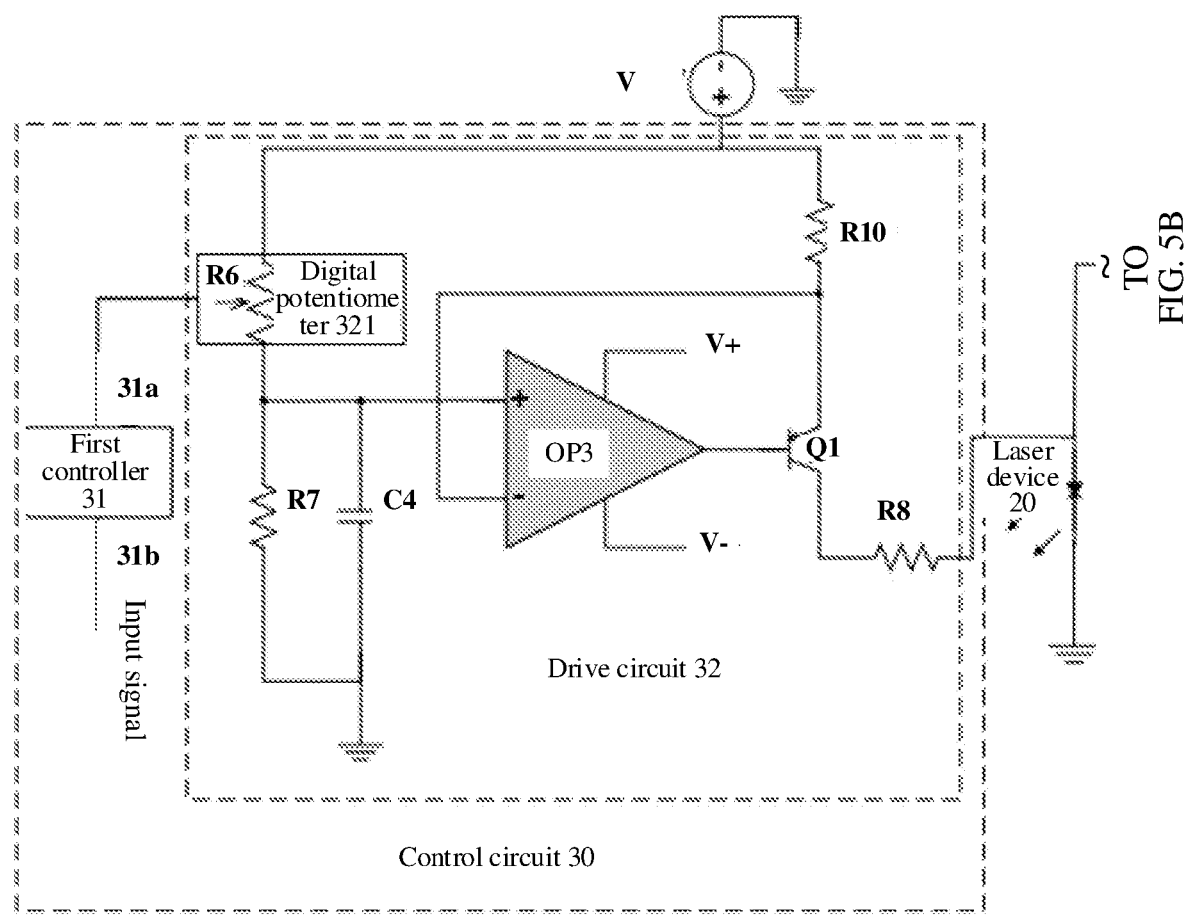
FIG. 5A to FIG. 5C are example schematic diagrams of a circuit structure of a laser microphone according to another embodiment of this application.

Referring to FIG. 4A and FIG. 5A, in an implementation of this application, the control circuit 30 includes a first controller 31 and a drive circuit 32 connected to the first controller 31. The drive circuit 32 includes a digital potentiometer 321, a resistor R7, a resistor R8, a capacitor C4, an operational amplifier OP3, a transistor Q1, and a resistor R10. The digital potentiometer 321 includes a variable resistor R6, an output port 31a of the first controller 31 is connected to the digital potentiometer 321, and an input signal of an input end 31b of the first controller 31 is an output signal of the self-mixing signal obtaining apparatus 40. A first end portion of the digital potentiometer 321 is connected to a non-inverting input end of the operational amplifier OP3, and a second end portion of the digital potentiometer 321 is connected to a first end portion of the resistor R10. Both the second end portion of the digital potentiometer 321 and the first end portion of the resistor R10 are connected to a positive power supply. A first end portion of the resistor R7 and a first end portion of the capacitor C4 are connected between the first end portion of the digital potentiometer 321 and the non-inverting input end of the operational amplifier OP3, and both a second end portion of the resistor R7 and a second end portion of the capacitor C4 are grounded. A second end portion of the resistor R10 is connected to an emitter of the transistor Q1, an inverting input end of the operational amplifier OP3 is connected between the second end portion of the resistor R10 and the emitter of the transistor Q1, and an output end of the operational amplifier OP3 is connected to a base of the transistor Q1. A first end portion of the resistor R8 is connected to a collector of the transistor Q1, and a second end portion of the resistor R8 serves as an output terminal of the control circuit 30 and is connected to an anode of the laser device 20. Referring to FIG. 1 and FIG. 2, the input port 31b of the first controller 31 serves as the input terminal 30b of the control circuit 30 and is connected to the output port 40c of the self-mixing signal obtaining apparatus 40. In the control circuit 30, the variable resistor R6 and the resistor R7 are voltage divider resistors, and may perform a voltage divider function. The resistor R8 and the resistor R10 may perform a current limiting function, where R10 may control a current that passes through the transistor Q1, to avoid excessive power consumption caused by an excessively large current of the transistor Q1. The capacitor C4 may implement soft start of the drive circuit 32. In an implementation of this application, the first controller 31 outputs a control signal based on the obtained output signal of the self-mixing signal obtaining apparatus 40 to control an effective resistance value of the variable resistor R6. By changing the effective resistance value of the variable resistor R6, a drive current output by the drive circuit 32 to the laser device 20 can be controlled and adjusted, so that the drive current of the laser device 20 can be adjusted. The drive circuit 32 is a constant current source circuit, and may provide a constant direct current bias current that hardly varies with the temperature for the laser device 20, so as to stabilize the operating point.

Figure 4B:
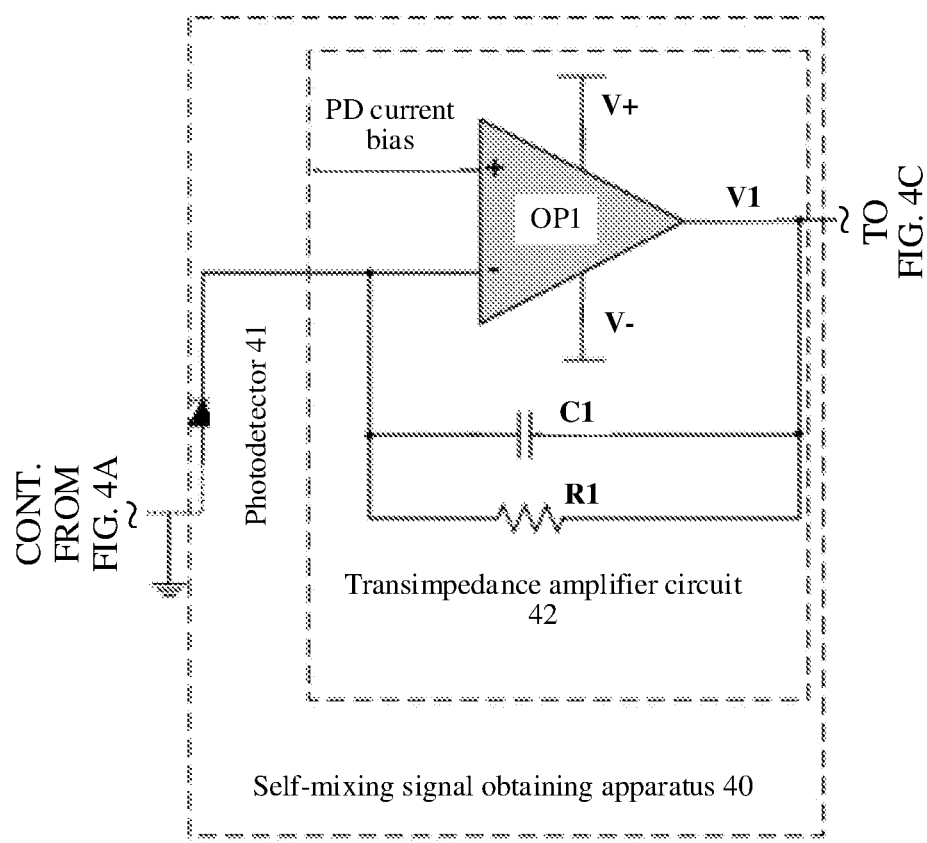
Figure 4C:
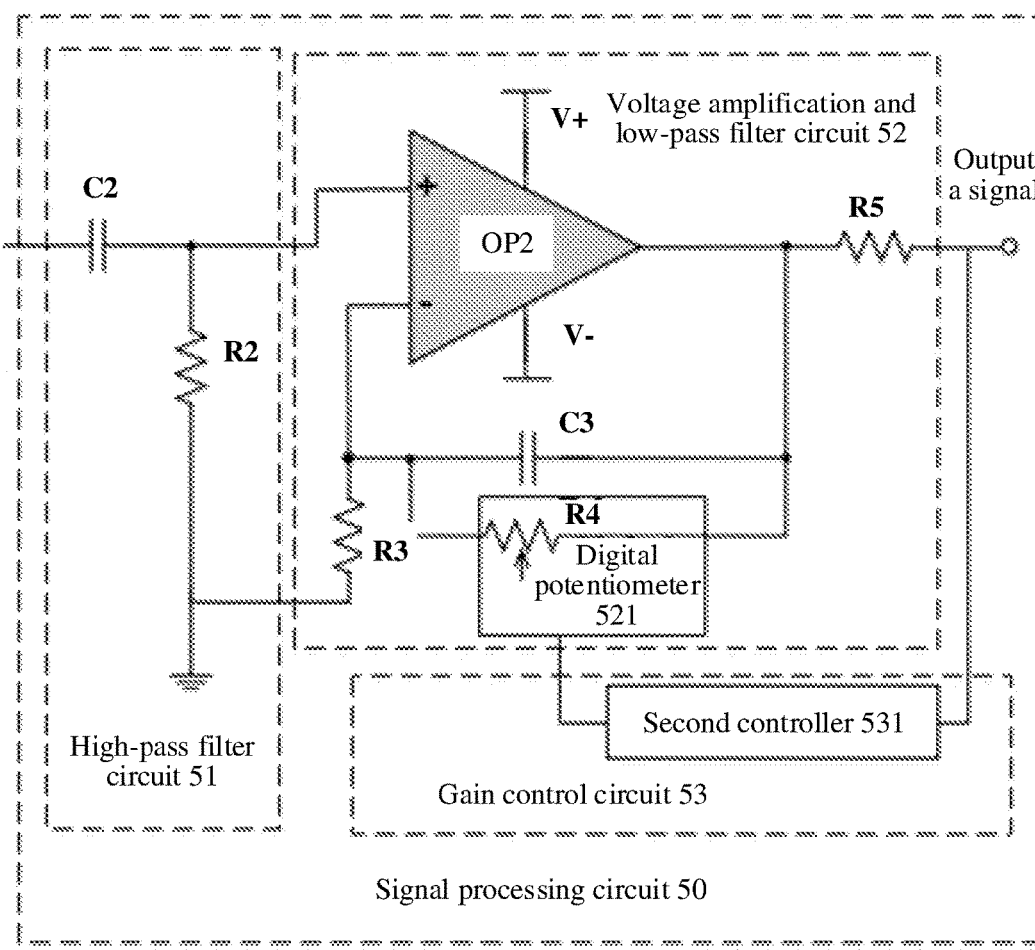

Referring to FIG. 4A to FIG. 4C, in some implementations of this application, the self-mixing signal obtaining apparatus 40 includes a photodetector 41 and a transimpedance amplifier circuit 42. The photodetector 41 is connected to the laser device 20, and an input end of the transimpedance amplifier circuit 42 is connected to the photodetector 41. The output end of the control circuit 30, that is, the second end portion of the resistor R8, is connected to the anode of the laser device 20, an anode of the photodetector 41 is electrically connected to a cathode of the laser device 20, and the photodetector 41 and the laser device 20 are grounded through the same electrode. A cathode of the photodetector 41 is connected to the input end of the transimpedance amplifier circuit 42, and an output end of the transimpedance amplifier circuit 42 serves as the output port 40b (referring to FIG. 1) of the self-mixing signal obtaining apparatus 40 and is connected to an input end of the high-pass filter circuit 51.

In an implementation of this application, the transimpedance amplifier circuit 42 includes an operational amplifier OP1, a resistor R1, and a capacitor C1. An output end of the photodetector 41 is connected to an inverting input end of the operational amplifier OP1. A first end portion of the resistor R1 and a first end portion of the capacitor C1 are both connected between the output end of the photodetector 41 and the inverting input end of the operational amplifier OP1, and a second end portion of the resistor R1 and a second end portion of the capacitor C1 are both connected to an output end of the operational amplifier OP1. A current bias of the photodetector is inputted into a non-inverting input end of the operational amplifier OP1, and the output end of the operational amplifier OP1 serves as the output end of the self-mixing signal obtaining apparatus 40 and is connected to the input end of the high-pass filter circuit 51. The capacitor C1 is a feedback compensation capacitor that compensates for a node capacitance of the photodetector and an input capacitance of the operational amplifier to keep the circuit stable. The resistor R1 is a feedback resistor and is configured to convert a current signal into a voltage signal.

Figure 5B:
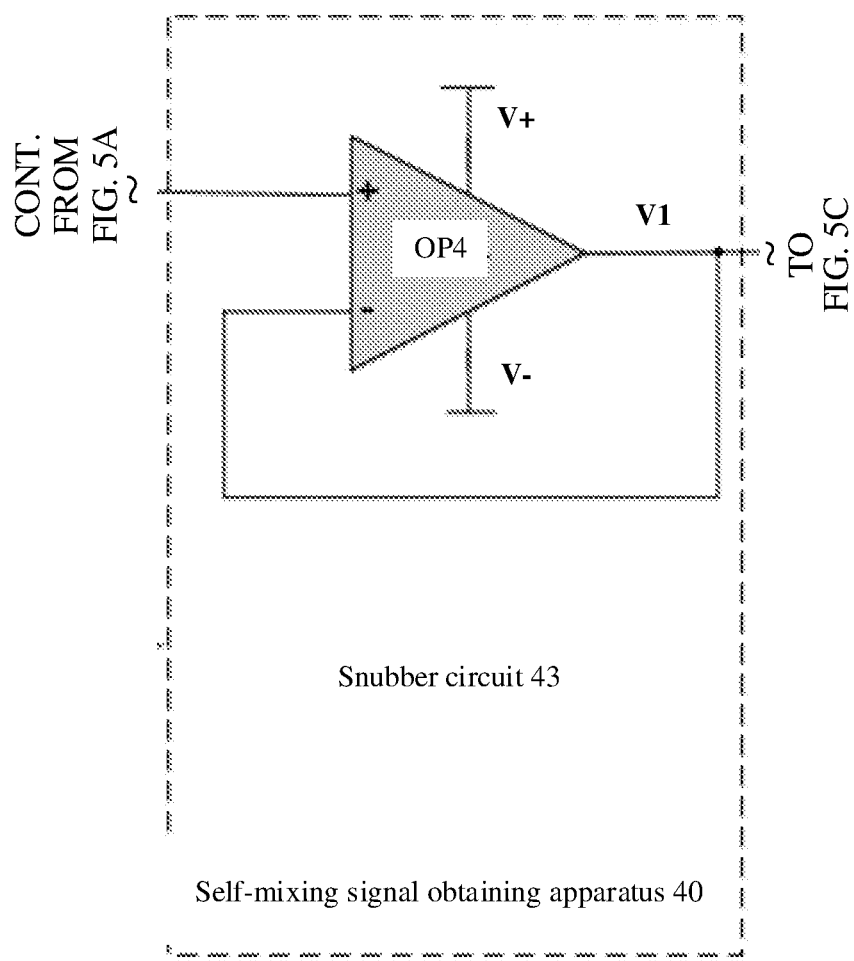
Figure 5C:
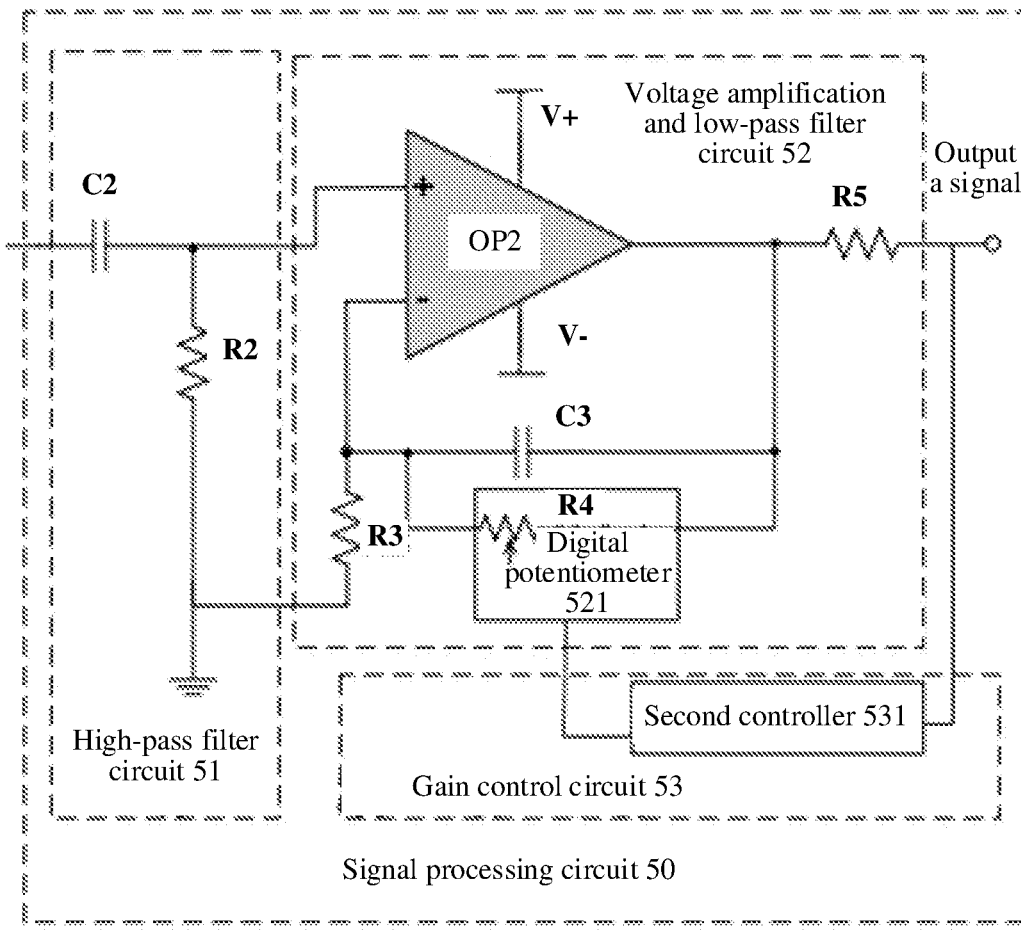

Referring to FIG. 5A to FIG. 5C, in some other implementations of this application, the self-mixing signal obtaining apparatus 40 includes a snubber circuit 43 connected to the laser device 20. The snubber circuit 43 includes an operational amplifier OP4. A non-inverting input end of the operational amplifier OP4 is connected to the anode of the laser device 20, and the cathode of the laser device 20 is connected to the ground. An output end of the operational amplifier OP4 serves as the output port 40b (referring to FIG. 1) of the self-mixing signal obtaining apparatus 40 and is connected to the input end of the high-pass filter circuit 51. An inverting input end of the operational amplifier OP4 is connected between the output end of the operational amplifier OP4 and the input end of the high-pass filter circuit 51.

Referring to FIG. 4C and FIG. 5C, in an implementation of this application, the signal processing circuit 50 includes the high-pass filter circuit 51, the voltage amplification and low-pass filter circuit 52, and the gain control circuit 53.

The high-pass filter circuit 51 includes a capacitor C2 and a resistor R2. A first end portion of the capacitor C2 serves as the input end of the high-pass filter circuit 51 and is connected to the output port 40b of the self-mixing signal obtaining apparatus 40, and a second end portion of the capacitor C2 serves as the output end of the high-pass filter circuit 51 and is connected to the voltage amplification and low-pass filter circuit 52. A first end portion of the resistor R2 is connected to the second end portion of the capacitor C2, and a second end portion of the resistor R2 is connected to the ground. The high-pass filter circuit 51 formed by the capacitor C2 and the resistor R2 can filter out a DC current and low-frequency signals. The voltage amplification and low-pass filter circuit 52 includes an operational amplifier OP2, a capacitor C3, a digital potentiometer 521, a resistor R3, and a resistor R5. A non-inverting input end of the operational amplifier OP2 serves as the input end of the voltage amplification and low-pass filter circuit 52 and is connected to the output end of the high-pass filter circuit 51, and an output end of the operational amplifier OP2 is connected to a first end portion of the resistor R5. A second end portion of the resistor R5 serves as the output end of the voltage amplification and low-pass filter circuit 52, that is, the output end of the signal processing circuit 50, and outputs an audio voltage signal to the outside. A first end portion of the resistor R3, a first end portion of the digital potentiometer 521, and a first end portion of the capacitor C3 are all connected to an inverting input end of the operational amplifier OP2. Both a second end portion of the digital potentiometer 521 and a second end portion of the capacitor C3 are connected between the output end of the operational amplifier OP2 and the first end portion of the resistor R5, and a second end portion of the resistor R3 is connected to the ground. The digital potentiometer 521 is connected to the gain control circuit 53. The digital potentiometer 521 includes one variable resistor R4. A low-pass filter circuit can filter out high-frequency signals.

The high-pass filter circuit 51 and the voltage amplification and low-pass filter circuit 52 may form a bandpass filter circuit, where a lower cutoff frequency of the bandpass is determined by R2 and C2, and the upper cutoff frequency is determined by R4 and C3. A range of the bandpass may be 20 Hz to 20 kHz, to filter out low-frequency background sound and high-frequency signals. The two-level amplifier circuit systems OP1 and OP2 are at different direct current operating points.

The gain control circuit 53 includes a second controller 531, where an input end of the second controller 531 is connected to the output end of the signal processing circuit 50, and is configured to capture a voltage signal output by the signal processing circuit 50, and an output end of the second controller 531 is connected to the digital potentiometer 521. The second controller 531 outputs a control signal to control an effective resistance value of the variable resistor R4 of the digital potentiometer 521, adjustment of the gain of the voltage amplification and low-pass filter circuit 52 may be realized by changing the effective resistance value of R4, and the operating status of the circuit may be optimized in real time according to the output signal. The gain of the amplifier circuit is A=1+R4/R3.

In an implementation of this application, the operational amplifier OP1, the operational amplifier OP2, the operational amplifier OP3, and the operational amplifier OP4 are low-noise operational amplifiers, and may use a power supply circuit with high power supply rejection ratio (PSRR) (such as LDO) to supply power, and the use of the low-noise operational amplifier helps to improve the signal-to-noise ratio. A resistance value of each resistor above is as small as possible under a condition that the function is met, so as to reduce thermal noise generated by the resistor. In an implementation of this application, the first controller 31 and the second controller 531 may be separately disposed, or may be a same controller.

Figure 6:
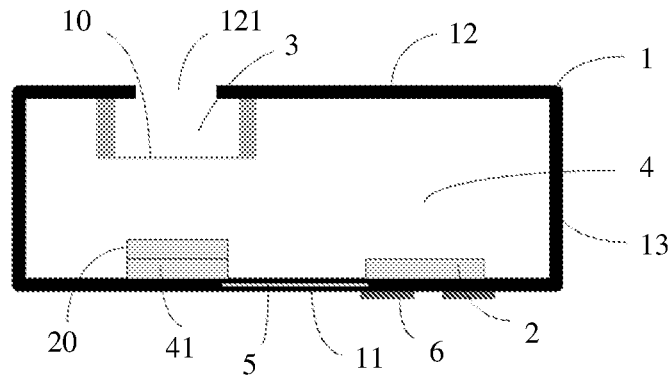
FIG. 6 is an example schematic structural diagram of a laser microphone with a top sound receiving structure according to an embodiment of this application.

Referring to FIG. 6, in an implementation of this application, the laser microphone 100 includes a housing 1. The housing 1 includes a substrate 11, a lid 12, and a middle frame 13 that are disposed oppositely to each other. The substrate 11, the lid 12, and the middle frame 13 surround to form an accommodating cavity. The diaphragm 10, the laser device 20, the photodetector 41, and an ASIC chip 2 are all disposed in the accommodating cavity. The diaphragm 10 is fixed on the lid 12, the laser device 20 is disposed on the substrate 11, and the photodetector 41 is disposed on the substrate 11, and is located on a side of the laser device 20 away from the diaphragm 10. A sound pickup hole 121 is disposed on the lid 12, and the diaphragm 10 and the sound pickup hole 121 are disposed correspondingly. The laser microphone 100 of this embodiment transmits and feeds back light beams in the same path, does not need to refer to an interference arm, has fewer components, has a self-aligned optical path, and can be packaged in a smaller size.

In an implementation of this application, a distance between the diaphragm 10 and a light emitting surface of the laser device 20 (that is, a side facing the diaphragm 10) is set within a range of 30 μm to 300 μm. A proper distance can improve coupling efficiency between light reflected back to the laser device through the diaphragm 10 and light in the cavity of the laser device. Specifically, in some implementations, a distance between the diaphragm 10 and the laser device 20 may be set within a range of 50 μm to 100 μm. In some other implementations, a distance between the diaphragm 10 and the laser device 20 may be set within a range of 100 μm to 200 μm.

In an implementation of this application, the diaphragm 10 may sense air vibration generated by external sound waves, generate vibration, and reflect light emitted by the laser device back to the resonant cavity of the laser device. The external sound waves can be transmitted to the diaphragm 10 through the sound pickup hole 121. In the embodiments of this application, the laser microphone is different from a conventional MEMS microphone which has a capacitance detection mechanism, and does not need to be disposed with a back electrode plate. Therefore, there is no special requirement on a conductive characteristic of the diaphragm. The diaphragm 10 may be a MEMS diaphragm, a metal glass diaphragm, a graphene diaphragm, a polymer film, or a metal film. A reflection layer may be disposed on a side that is of the diaphragm 10 and that faces the laser device 20, so as to improve reflectivity. A material of the reflection layer may be a high-reflectivity metal such as aluminum or gold. A side of the diaphragm 10 plated with the reflection layer faces the light emitting surface of the laser device 20, and is center-aligned. In the embodiments of this application, a silicon-on-insulator (SOI) film layer with negative stress is combined with a metal reflection layer with positive stress, thereby reducing stress on the diaphragm, and further improving sound pressure displacement sensitivity of the diaphragm. In the embodiments of this application, a diaphragm with no back electrode is used, so that squeeze-film damping is reduced, sound pressure displacement sensitivity is improved, and noise is reduced. The design of the diaphragm in the embodiments of this application allows detection of weaker sound and a stronger sound signal response amplitude, which facilitates implementation of a high signal-to-noise ratio.

In an implementation of this application, one or more balancing holes are disposed on the diaphragm 10, and are configured to balance atmospheric pressure inside and outside the diaphragm. A diameter of the balancing holes may range from 1 μm to 5 μm (including endpoint values 1 μm and 5 μm). In some implementations of this application, the diaphragm 10 is a MEMS silicon diaphragm, has thickness of 300 nm to 800 nm, and a diameter of 600 μm to 1200 μm. A surface of a central region of the MEMS silicon diaphragm is plated with a high-reflection metal layer, for example, an aluminum layer or a gold layer. The thickness of the metal layer may be 30 nm to 100 nm (including endpoint values 30 nm and 100 nm), and a radius of the metal layer is 20 μm to 50 μm. The sound pressure displacement sensitivity of the MEMS silicon diaphragm ranges from 0.05 μm/Pa to 0.5 μm/Pa. For example, in a specific embodiment of this application, the MEMS silicon diaphragm has thickness of 400 nm and a diameter of 900 µm. A central region of the diaphragm is plated with aluminum, and the aluminum layer has thickness of 90 nm and a radius of 30 µm. Two balancing holes are disposed on the diaphragm, and a diameter of each balancing hole is 2 µm. The sound pressure displacement sensitivity of the MEMS diaphragm is 0.1 µm/Pa. In the embodiments of this application, the diaphragm is manufactured by using a silicon substrate based on SOI or polysilicon, which helps reduce stress and improve sound pressure displacement sensitivity. The arrangement of the metal reflection layer can balance the stress of the film layer and improve the optical reflectivity of the diaphragm. Through stress control, the linearity of the vibration amplitude of the diaphragm with the change of sound pressure is further improved.

In an implementation of this application, the laser microphone 100 may be of a top sound receiving structure. As shown in FIG. 6, the diaphragm 10 is located on the lid 12, and the sound pickup hole 121 is disposed on the lid 12. A front chamber 3 is formed between the diaphragm 10 and the lid 12, and a back chamber 4 is formed between the diaphragm 10 and the housing. The diaphragm 10 is disposed on the lid 12 to form a larger back chamber 4. In the top sound receiving structure, the diaphragm 10, the laser device 20, and the sound pickup hole 121 are disposed correspondingly, and may be specifically disposed coaxially. Generally, the laser microphone with the top sound receiving structure is fixed on a printed circuit board (PCB) board in a terminal by using the substrate 11. The photodetector 41 is electrically connected to the chip 2 by using a metal line 5, and the chip 2 is directly electrically connected to an external metal electrode 6 through a via on the substrate 11.

Figure 7:
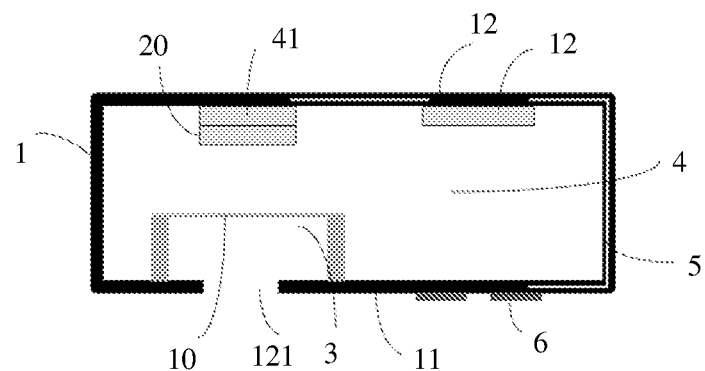
FIG. 7 is an example schematic structural diagram of a laser microphone with a bottom sound receiving structure according to an embodiment of this application.

In an implementation of this application, the laser microphone 100 may alternatively be a bottom sound receiving structure. As shown in FIG. 7, the diaphragm 10 is located on the substrate 11, and the sound pickup hole 121 is disposed on the substrate 11, and is disposed corresponding to the diaphragm 10. The laser device 20 and the photodetector 41 are located on the lid 12, the front chamber 3 is formed between the diaphragm 10 and the substrate 11, and a back chamber 4 is formed between the diaphragm 10 and the housing. The diaphragm 10 is disposed on the substrate 11 to form a larger back chamber 4. In the bottom sound receiving structure, the diaphragm 10, the laser device 20, and the sound pickup hole 121 are disposed correspondingly, and may be specifically disposed coaxially. There may be one or more sound pickup holes 121. Generally, the laser microphone with the bottom sound receiving structure is fixed on a PCB board in a terminal by using the substrate 11. The photodetector 41 is electrically connected to the chip 2 by using a metal line 5, and the chip 2 is directly electrically connected to an external metal electrode 6 through the metal line 5 and a via on the substrate 11.

The laser microphone with the above two structures obtains a back chamber with a larger air volume, so that the sound wave can easily push the diaphragm to move, thereby improving the sensitivity and signal-to-noise ratio of the microphone.

In an implementation of this application, to reliably package the diaphragm 10, the laser device 20, the photodetector 41, and the ASIC chip 2, the substrate 11, the lid 12, and the middle frame 13 all use a PCB material, or the substrate 11 uses a PCB material or a ceramic material. The lid 12 and the middle frame 13 are of an integrated structure and are made of metal or the like.

Referring to FIG. 6 and FIG. 7, in an implementation of this application, when the self-mixing light signal obtaining apparatus 40 includes the photodetector 41 and the transimpedance amplifier circuit 42, the photodetector 41 and the laser device 20 may be integrated on one optical chip, and the photodetector 41 is located on a side of the laser device 20 away from the diaphragm 10. The transimpedance amplifier circuit 42 may be integrated with the control circuit 30 and the signal processing circuit 50 on one ASIC chip 2. The photodetector 41 and the laser device 20 are integrated on one optical chip, so that efficiency of coupling light transmitted from the back of the laser device into the photodetector can be improved, thereby improving the signal-to-noise ratio, and at the same time, optical path deviation caused by the discrete arrangement in the case of vibration, drop, and the like can be avoided. This keeps signal consistent throughout the life cycle of the module. Certainly, in some other implementations of this application, the photodetector 41 and the laser device 20 may alternatively be disposed discretely. The laser device 20 may be directly attached to the photodetector 41, and a back surface of the laser device 20, that is, a surface that is way from the diaphragm 10 and that emits light, may alternatively be directly coupled into the photodetector 41. In an implementation of this application, an operating wavelength of the photodetector 41 may range from 360 nm to 1600 nm (including endpoint values 360 nm and 1600 nm).

In some other implementations of this application, when the self-mixing signal obtaining apparatus 40 includes a snubber circuit, the snubber circuit, the control circuit 30, and the signal processing circuit 50 may be integrated on one ASIC chip 2.

In an implementation of this application, the laser device 20 is a self-mixing laser device, and a specific type thereof is not limited. The laser device may be a vertical cavity surface emitting laser, or may be an edge emitting laser. A light emitting wavelength of the laser device may range from 750 nm to 1600 nm. In some implementations of this application, the laser device 20 is a single-mode vertical cavity surface emitting laser (VCSEL), and a light emitting wavelength thereof is 850 nm. Atypical threshold current of the VCSEL is 0.7 mA, a typical operating current is about 2.5 mA, typical output power is about 0.5 mW, and a typical output photocurrent of a corresponding photodetector is 0.5 mA. Typical dimensions of the VCSEL may range from 120 µm to 200 µm in length, 120 µm to 200 µm in width, and 100 µm to 150 µm in thickness.

Figure 8:
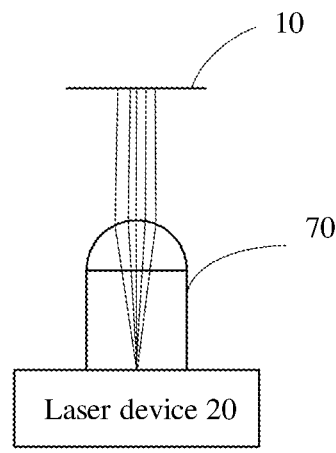
FIG. 8 is an example schematic arrangement diagram of a lens according to an embodiment of this application.

Referring to FIG. 8, in some embodiments of this application, the laser microphone further includes a light beam coupling apparatus, located between the laser device 20 and the diaphragm 10. The light beam coupling apparatus may include one or more lenses 70, and the lenses 70 are made on the light emitting surface of the laser 20. In an implementation of this application, the lens 70 may be a collimating lens, or may be a converging lens. A lens is used to couple output light and reflected light, so that feedback coupling efficiency can be improved, and feedback light intensity of a signal carrying vibration of the diaphragm can be increased, thereby improving the signal-to-noise ratio of the laser microphone. As shown in FIG. 8, in some implementations of this application, the lens 70 is a collimating lens, including a lens cylinder and a curved lens surface. The lens cylinder may be produced in a manner of photolithography, laser direct writing, or the like, and the curved lens surface may be produced in a manner of embossing, inkjet printing, or the like. The collimating lens can collimate output light of the laser device to a reflection surface of the diaphragm, and couple reflected light into a light emitting hole of the laser device. By disposing the collimating lens, light reflected back to the laser device can be greatly increased, thereby increasing light intensity of the feedback signal, and further improving the signal-to-noise ratio of the microphone. A material of the lens is a material whose transmittance is greater than 90% within an operating wavelength range of the laser device. In an implementation of this application, a horizontal dimension (that is, length and width dimensions) of each lens ranges from 20 μm to 200 μm (including endpoint values 20 μm and 200 μm), and a longitudinal dimension (that is, a height dimension) of each lens ranges from 20 μm to 200 μm (including endpoint values 20 μm and 200 μm).

In an implementation of this application, all parameter values that have a numerical value range include two endpoint values.

According to the laser microphone in the embodiments of this application, sound pressure displacement sensitivity of the diaphragm is improved based on a diaphragm design with no back electrode, and a detection capability of a weak vibration signal is improved through a laser self-mixing interference effect, thereby improving vibration response sensitivity and a dynamic range, so that a slight voice signal can be picked up. In this embodiment, the vibration of the diaphragm is detected in a manner of laser self-mixing coherent, which has high detection sensitivity. According to the embodiments of this application, the laser microphone can significantly improve voice pickup in a soft-spoken mode in a quiet scenario, detection of a long-distance weak voice signal, and voice pickup quality during long-distance video recording. A signal-to-noise ratio of the laser microphone in the embodiments of this application is greater than 75 dB, for example, 80 dB. Compared with a conventional MEMS microphone (with a signal-to-noise ratio of 65 dB), the signal-to-noise ratio is significantly improved.

Figure 9:
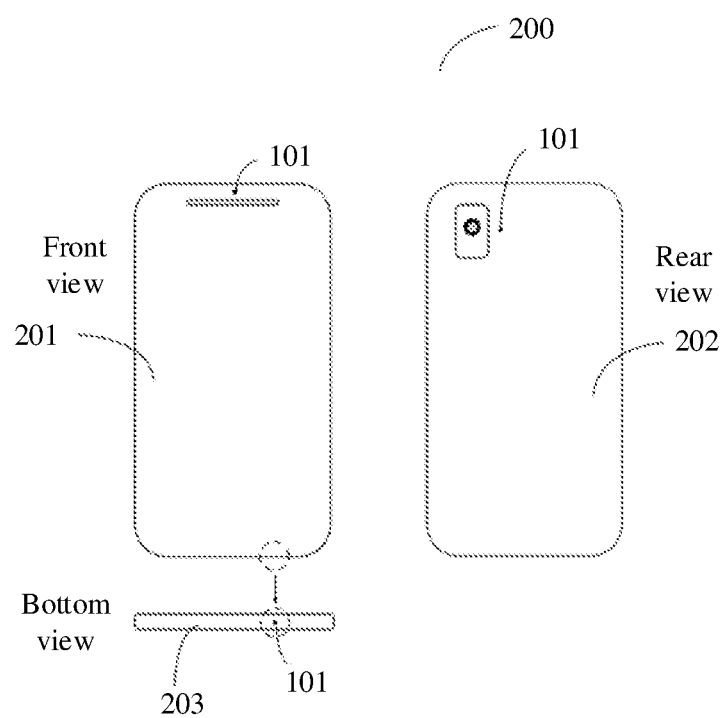
FIG. 9 is an example schematic diagram of a disposing position of a laser microphone in a terminal according to an embodiment of this application.

Referring to FIG. 9, an embodiment of this application further provides a terminal 200, including the laser microphone 100 according to the embodiments of this application. The terminal 200 includes an external housing and a circuit board disposed in the external housing, and the laser microphone is disposed on the circuit board. A sound receiving hole 101 corresponding to a position of the laser microphone is disposed on the external housing of the terminal, and external sound is transmitted to the laser microphone through the sound receiving hole 101 of the external housing. The laser microphone 100 may be disposed corresponding to the front side of the terminal, and correspondingly, the sound receiving hole 101 is disposed on a front side lid 201 of the terminal (referring to the front view of FIG. 9). Alternatively, the laser microphone 100 may be disposed corresponding to the rear side of the terminal, and correspondingly, the sound receiving hole 101 is disposed on a rear side lid 202 of the terminal (referring to the rear view of FIG. 9). Alternatively, the laser microphone 100 may be disposed corresponding to a side middle frame 203 of the terminal, and correspondingly, the sound receiving hole 101 is disposed on the side middle frame 203 of the terminal. Specifically, as shown in a bottom view in FIG. 9, the sound receiving hole 101 is disposed on a lower side middle frame of the terminal, and may alternatively be disposed on the upper side, left side, or right side middle frame. The sound pickup hole of the laser microphone 100 is disposed correspondingly to the sound receiving hole 101 on the external housing of the terminal, and may be specifically disposed coaxially. The middle frame 203 and the rear side lid 202 may be an integrally formed structure, or may be a split structure. The terminal 200 may be a terminal product in scenarios in which voice command control is required or voice needs to be captured, recorded, processed, or analyzed, such as a mobile phone, a notebook computer, a tablet computer, a smart TV, a smart speaker, a headset, a video camera, a network camera, a wearable device, a game device, an in-vehicle audio system or microphone, a voice navigation device, a dictation voice recognition device, a voice-to-text converter, or the like.

What is claimed is:

1. A laser microphone, comprising:
   a diaphragm;
   a laser device;
   a control circuit;
   a self-mixing signal obtaining apparatus; and
   a signal processing circuit, wherein
   the laser device is configured to emit light to the diaphragm, and receive a feedback light signal from the diaphragm, the feedback light signal interferes with laser in a resonant cavity of the laser device and obtains a self-mixing light signal, a distance between the laser device and the diaphragm is L, and a range of L is 30 μm≤L≤300 μm,
   the control circuit is connected to the laser device, and the control circuit is configured to drive and control the laser device to emit light,
   the self-mixing signal obtaining apparatus is connected to the laser device, and the self-mixing signal obtaining apparatus is configured to obtain and output a target voltage signal related to the self-mixing light signal, and
   the signal processing circuit is connected to the self-mixing signal obtaining apparatus, and the signal processing circuit is configured to receive the target voltage signal output by the self-mixing signal obtaining apparatus, and process the target voltage signal into an audio voltage signal.

2. The laser microphone according to claim 1, wherein
   the self-mixing signal obtaining apparatus includes an output end connected to an input end of the control circuit, and
   the control circuit determines a drive current $A_j$ of the laser device based on the target voltage signal output by the self-mixing signal obtaining apparatus.

3. The laser microphone according to claim 2, wherein when a $j^{th}$ drive current modulation is performed in an operating mode of the laser device, the control circuit determining the drive current $A_j$ of the laser device comprises:
   determining, by the control circuit based on a drive current $A_{j-1}$ obtained after previous drive current modulation, a scanning current range $[I_{min}, I_{max}]$ of current drive current modulation, wherein $I_{min}=A_{j-1}-I_0$, $I_{max}=A_{j-1}+I_0$, 0.1 mA≤$I_0$≤0.5 mA and 0.1 mA≤$I_0$0.5 mA, represents a quantity of times of drive current modulation, and j is an integer greater than or equal to 2;
   applying, by the control circuit, a scanning current It to the laser device by using $I_{min}$ as an initial value, $\Delta I$ as a step size, and $I_{max}$ as an end value, superimposing an alternating current $I_c$ on the scanning current $I_t$ during each scanning, and obtaining a peak-to-peak value $\Delta V_t$ of output voltage fluctuation in each scanning, wherein $\Delta I$ is a preset current, the alternating current $I_c$ is a preset current, and a frequency of the alternating current $I_c$ is greater than a maximum frequency of sound capable of being heard by a human ear, $\Delta V_t$ is related to the frequency of the alternating current $I_c$ and t represents a quantity of times of current scanning; and determining a scanning current $I_t$ corresponding to $\Delta V_t$ of the largest value in a plurality of $\Delta V_t$, obtained in the process of performing applying the scanning current $I_t$ to the laser device, as the drive current $A_j$ of the laser device obtained through the current drive current modulation.

4. The laser microphone according to claim 2, wherein when the laser device starts an operating mode, the control circuit determining the drive current $A_j$ of the laser device comprises:

applying, by the control circuit, a scanning current $I_{t'}$ to the laser device by using $I_{min'}$ as an initial value, $\Delta I$ as a step size, and $I_{max'}$ as an end value, superimposing an alternating current $I_c$ on the scanning current $I_{t'}$ during each scanning, and obtaining a peak-to-peak value $\Delta V_{t'}$ of output voltage fluctuation in each scanning, wherein $I_{min'}$ is a preset minimum drive current, $I_{max'}$ is a preset maximum drive current, $\Delta I$ is a preset current, the alternating current $I_c$ is a preset current, a frequency of the alternating current $I_c$ is greater than a maximum frequency of sound capable of being heard by a human ear, $\Delta V_{t'}$ is related to the frequency of the alternating current $I_c$, and t' represents a quantity of times of current scanning; and determining a scanning current $I_{t'}$ corresponding to $\Delta V_{t'}$ of a largest value in a plurality of $\Delta V_{t'}$, obtained in the process of performing applying the scanning current $I_{t'}$ to the laser device, as the drive current $A_j$ of the laser device.

5. The laser microphone according to claim 3, wherein a range of $\Delta I$ is 10 μA≤$\Delta I$≤50 μA.

6. The laser microphone according to claim 3, wherein a frequency range of the alternating current $I_c$ is 20 kHz<$I_c$≤50 kHz.

7. The laser microphone according to claim 1, wherein the self-mixing signal obtaining apparatus is configured to detect the self-mixing light signal in the resonant cavity of the laser device, and the self-mixing signal obtaining apparatus is configured to output the target voltage signal related to the self-mixing light signal.

8. The laser microphone according to claim 7, wherein the self-mixing signal obtaining apparatus comprises a photodetector and a transimpedance amplifier circuit, the photodetector is connected to the laser device, and the photodetector is configured to detect the self-mixing light signal in the resonant cavity of the laser device and convert the self-mixing light signal into a current signal, and the transimpedance amplifier circuit is connected to the photodetector, and the transimpedance amplifier circuit is configured to convert the current signal into the target voltage signal.

9. The laser microphone according to claim 8, wherein the photodetector and the laser device are monolithically integrated on one chip, and the photodetector is located on a side of the laser device facing away from the diaphragm.

10. The laser microphone according to claim 1, wherein the self-mixing signal obtaining apparatus comprises a snubber circuit connected to the laser device, the snubber circuit is configured to obtain a terminal voltage of the laser device, and the terminal voltage of the laser device is related to the self-mixing light signal.

11. The laser microphone according to claim 1, wherein the signal processing circuit comprises a high-pass filter circuit and a voltage amplification and low-pass filter circuit, the high-pass filter circuit is connected to the self-mixing signal obtaining apparatus, and the voltage amplification and low-pass filter circuit is connected to the high-pass filter circuit.

12. The laser microphone according to claim 11, wherein the signal processing circuit further comprises a gain control circuit connected to the voltage amplification and low-pass filter circuit, and the gain control circuit is configured to adjust a gain of the voltage amplification and low-pass filter circuit based on an output signal of the voltage amplification and low-pass filter circuit.

13. The laser microphone according to claim 1, wherein a light beam coupling apparatus is disposed on a light emitting surface of the laser device facing the diaphragm, and the light beam coupling apparatus comprises one or more lenses.

14. The laser microphone according to claim 13, wherein a horizontal dimension of each lens ranges from 20 μm to 200 μm, and a longitudinal dimension of each lens ranges from 20 μm to 200 μm.

15. The laser microphone according to claim 1, wherein the diaphragm comprises a microelectromechanical systems (MEMS) diaphragm, a metal glass diaphragm, a graphene diaphragm, a polymer film, or a metal film.

16. The laser microphone according to claim 15, wherein a reflection layer is disposed on a side of the diaphragm facing the laser device.

17. The laser microphone according to claim 1, wherein the laser device includes a vertical cavity surface emitting laser or an edge emitting laser.

18. The laser microphone according to claim 1, further comprising:

a housing, wherein the diaphragm, the laser device, the control circuit, the self-mixing signal obtaining apparatus, and the signal processing circuit are all disposed in the housing, and a sound pickup hole is disposed on the housing at a position corresponding to the diaphragm.

19. A terminal, comprising:

a laser microphone, wherein the laser microphone comprises:

a diaphragm;

a laser device;

a control circuit;

a self-mixing signal obtaining apparatus; and a signal processing circuit, wherein the laser device is configured to emit light to the diaphragm, and receive a feedback light signal from the diaphragm, the feedback light signal interferes with laser in a resonant cavity of the laser device and obtains a self-mixing light signal, a distance between the laser device and the diaphragm is L, and a range of L is 30 μm≤L≤300 μm, the control circuit is connected to the laser device, and the control circuit is configured to drive and control the laser device to emit light, the self-mixing signal obtaining apparatus is connected to the laser device, and the self-mixing signal obtaining apparatus is configured to obtain and output a target voltage signal related to the self-mixing light signal, and the signal processing circuit is connected to the self-mixing signal obtaining apparatus, and the signal processing circuit is configured to receive the target voltage signal output by the self-mixing signal obtaining apparatus, and process the target voltage signal into an audio voltage signal.

20. A laser microphone, comprising:
a diaphragm;
a laser device;
a control circuit;
a self-mixing signal obtaining apparatus; and
a signal processing circuit, wherein
   the laser device is configured to emit light to the diaphragm, and receive a feedback light signal from the diaphragm, and the feedback light signal interferes with laser in a resonant cavity of the laser device and obtains a self-mixing light signal,
   the self-mixing signal obtaining apparatus is connected to the laser device, and the self-mixing signal obtaining apparatus is configured to obtain and output a target voltage signal related to the self-mixing light signal, and
   the signal processing circuit is configured to receive the target voltage signal output by the self-mixing signal obtaining apparatus, and process the target voltage signal into an audio voltage signal.

* * * * *